US011695709B2

(12) United States Patent
Wilkinson et al.

(10) Patent No.: US 11,695,709 B2
(45) Date of Patent: Jul. 4, 2023

(54) FAIR ARBITRATION BETWEEN MULTIPLE SOURCES TARGETING A DESTINATION

(71) Applicant: Graphcore Limited, Bristol (GB)

(72) Inventors: Daniel Wilkinson, Bristol (GB); Graham Cunningham, Chippenham (GB); Hachem Yassine, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 0 days.

(21) Appl. No.: 17/658,955

(22) Filed: Apr. 12, 2022

(65) Prior Publication Data

US 2023/0144797 A1 May 11, 2023

(30) Foreign Application Priority Data

Nov. 5, 2021 (GB) ..................................... 2115929

(51) Int. Cl.
| H04L 12/28 | (2006.01) |
| H04L 49/9047 | (2022.01) |
| H04L 49/90 | (2022.01) |
| H04L 47/52 | (2022.01) |
| H04L 49/00 | (2022.01) |
| H04L 47/62 | (2022.01) |

(52) U.S. Cl.
CPC .......... *H04L 49/9047* (2013.01); *H04L 47/52* (2013.01); *H04L 47/6225* (2013.01); *H04L 49/3018* (2013.01); *H04L 49/3027* (2013.01); *H04L 49/9026* (2013.01)

(58) Field of Classification Search
CPC . H04L 49/9047; H04L 45/52; H04L 47/6225; H04L 49/3027; H04L 49/9026
See application file for complete search history.

(56) References Cited

U.S. PATENT DOCUMENTS

| 7,006,438 | B2* | 2/2006 | West ..................... H04L 49/606 370/231 |
| 8,369,347 | B2* | 2/2013 | Xiong ................... H04L 49/357 709/236 |
| 10,735,337 | B1* | 8/2020 | Matthews ............... H04L 47/30 |
| 11,277,357 | B2* | 3/2022 | Gopalarathnam .. H04L 47/6295 |
| 2005/0147034 | A1 | 7/2005 | Zhao |

(Continued)

OTHER PUBLICATIONS

Combined Search and Examination Report dated Jul. 15, 2022 for United Kingdom Patent Application No. GB2115929.8. 8 pages.

*Primary Examiner* — Abdelnabi O Musa
(74) *Attorney, Agent, or Firm* — Haynes and Boone, LLP

(57) ABSTRACT

A hardware module comprises at least a first ingress buffer and a second ingress buffer, where the second ingress buffer holds data packets from a plurality of source components. To ensure fairness between one or more sources providing data to the first ingress buffer and the plurality of sources providing data to the second ingress buffer, processing circuitry examines source identifiers in packets held in the second ingress buffer and selects between the buffers so as to arbitrate between the sources. In some embodiments, the examination of the source identifiers provides statistics for a weighted round robin between the ingress buffers. In other embodiments, the source identifier of whichever packet is currently at the head of the second ingress buffer is used to perform a simple round robin between the sources.

18 Claims, 13 Drawing Sheets

(56) References Cited

U.S. PATENT DOCUMENTS

| | | | |
|---|---|---|---|
| 2007/0064597 A1 | 3/2007 | Bernick | |
| 2011/0286455 A1* | 11/2011 | Brown | H04L 47/70 370/392 |
| 2017/0195248 A1* | 7/2017 | Florea | G06F 12/10 |
| 2017/0195259 A1* | 7/2017 | Florea | H04L 47/726 |
| 2018/0041434 A1* | 2/2018 | Florea | H04L 49/901 |
| 2018/0048562 A1* | 2/2018 | Meyer | H04L 49/109 |
| 2020/0244601 A1* | 7/2020 | Gopalarathnam | H04L 45/245 |
| 2021/0168095 A1* | 6/2021 | Li | H04L 47/32 |
| 2021/0258252 A1* | 8/2021 | Olson | H04L 45/42 |
| 2022/0150164 A1* | 5/2022 | Berman | H04L 45/52 |

* cited by examiner

FAIR ARBITRATION BETWEEN MULTIPLE SOURCES TARGETING A DESTINATION

CROSS-REFERENCE TO RELATED APPLICATIONS

The present application claims priority to United Kingdom Patent Application No. GB2115929.8, filed Nov. 5, 2021, the disclosure of which is hereby incorporated herein by reference in its entirety.

TECHNICAL FIELD

The present application relates to a hardware module, and in particular to a hardware module for receiving data originating from a plurality of sources, and forwarding at least some of that data to a first destination.

BACKGROUND

In the context of processing data for complex or high volume applications, a work accelerator may be a subsystem to which processing of certain data is offloaded from a host system. Such a work accelerator may have specialised hardware for performing specific types of processing.

In particular, a work accelerator specialised for machine learning applications may have an architecture which supports a high degree of parallelism. One form of parallelism can be achieved by means of a processor comprising an arrangement of multiple tiles on the same chip (i.e. same die), each tile comprising its own respective processing unit and memory (including program memory and data memory). Thus, separate portions of program code can be run in parallel on different ones of the tiles. The tiles are connected together via an on-chip interconnect which enables data to be exchanged between them. Such an accelerator may function as a subsystem for a host system to perform parallel processing of datasets provided to it.

A work accelerator may be provided on an integrated circuit (i.e. a chip), which is a set of electronic circuits that are manufactured on a single piece of semiconductor material (e.g. silicon). In addition to the provision of multiple tiles of a work accelerator on a single chip, additional system on chip (SoC) components may be provided to support the operation of the work accelerator. Furthermore, various interfaces may be provided on the chip to support communication between the work accelerator and off-chip devices, such as other work accelerators or a host device.

When providing multiple different components, e.g. on a single chip, between which data exchange takes place, various challenges arise in providing for communication between those components.

SUMMARY

It is proposed to provide hardware modules for use as switches for forwarding data originating from multiple source components and destined for delivery to one or more destination components. For example, a switch may have multiple input ports for receiving data from different source components. Challenges arise in ensuring a fair transfer of data in the case that, by virtue of the arrangement of the network for transferring data packets between the components, at least some of the input ports receive data from multiple data sources. In this case, use of a simple round robin scheme to arbitrate between input ports may unfairly prioritise traffic from certain sources, i.e. those which share input ports with fewer other source components.

According to a first aspect, there is provided a hardware module for receiving data from a plurality of source components and forwarding at least some of that data to a first destination, the hardware module comprising: a first ingress port configured to receive a first set of data packets originating from a first subset of the source components and provide these to a first ingress buffer, wherein the first subset consists of one or more of the plurality of source components; a second ingress port configured to receive a second set of data packets originating from a second subset of the source components and provide these to a second ingress buffer, wherein the second subset of the source components comprises two or more source components, wherein the first subset consists of a different number of source components to the second subset; an egress port for outputting the first set of data packets and the second set of data packets; and processing circuitry configured to:

examine one or more second source identifiers in one or more of the second set of data packets to determine from which of the second subset of the source components each of the one or more of the second set of data packets originated from; and select between the first ingress buffer and the second ingress buffer from which to send data to the first destination in dependence upon the one or more second source identifiers so as to arbitrate between the plurality of source components for sending data to the first destination.

By analysing the origin (i.e. from which source component data packets originated) of the packets in the second ingress buffer, the processing circuitry is able to arbitrate between the plurality of sources for forwarding data over the egress port to the first destination. In this way, fairness may be achieved between the different sources. In some embodiments, the arbitration between sources is achieved by using the examination of the source identifiers in the second ingress buffer to provide statistics for a weighted round robin involving the first and second ingress buffer. In other embodiments, the source identifier of the packet at the head of the second ingress buffer is used to perform a simple round robin between the sources.

In some embodiments, the processing circuitry is configured to, upon selecting the second ingress buffer, send a first of the second set of data packets that is located at the head of the second ingress buffer, wherein the one or more second source identifiers are source identifiers of packets of the second set of data packets that were sent from the second ingress buffer prior to the sending of the first of the second set of data packets.

In some embodiments, the hardware module comprises a storage configured to store an indication of a number of the source components for which data was last sent from the second ingress buffer, wherein the selecting between the first ingress buffer and the second ingress buffer comprises performing a weighted round robin between the first ingress buffer and the second ingress buffer, wherein the second ingress buffer is weighted by the number of the source components for which data was last sent from the second ingress buffer.

In some embodiments, the hardware module comprises a set of ingress buffers configured to receive data originating from the second subset of the source components, the set of ingress buffers comprising the second ingress buffer.

In some embodiments, the storage comprises, for each of the second subset of source components, an indication of which of the set of ingress buffers data originating from the respective source component was last sent, wherein the indication of the number of source components is given by a number of the second subset of the source components for which the respective indication of which of the set of ingress buffers data originating from the respective source component was last sent specifies the second ingress buffer.

In some embodiments, a first of the first set of data packets that is located at head of the first ingress buffer originated from a first of the first subset of source components identified by a first source identifier, wherein the examining the one or more second source identifiers comprises examining a second source identifier in a first of the second set of data packets that is located at the head of the second ingress buffer, wherein the processing circuitry is configured to select the first of the second set of data packets for sending over the egress port in dependence upon the second source identifier in the first of the second set of data packets and the first source identifier.

In some embodiments, the processing circuitry is configured to determine the first source identifier by examining the first source identifier in the first of the first set of data packets.

In some embodiments, the hardware module further comprises a register storing an identifier of one of the plurality of source components for which data was most recently sent to the first destination, wherein the selecting between the first ingress buffer and the second ingress buffer comprises selecting a next one of the plurality of source components which follows the one of the plurality of source components identified in the register in a sequence.

In some embodiments, the selecting between the first ingress buffer and the second ingress buffer comprises applying a round robin scheme between the plurality of sources components.

In some embodiments, the first subset of the source components consists of a single source component, wherein the first ingress buffer is dedicated to hold data packets originating from the single source component.

In some embodiments, the egress port is configured to output data to a plurality of destinations including the first destination.

In some embodiments, some of the first set of data packets are for dispatch to different ones of the plurality of destinations, wherein the processing circuitry is configured to: examine a destination identifier in the one of the first set of data packets that is at the head of the first ingress buffer; and in response to determining that the destination identifier identifies the first destination, perform the selecting between the first ingress buffer and the second ingress buffer based on the one or more second source identifiers.

In some embodiments, the hardware module comprises a set of ingress buffers for storing data originating from the second subset of the source components, wherein each of the set of ingress buffers is dedicated for storing data for sending to a different destination of the plurality of destinations, wherein the second ingress buffer is dedicated for storing data for sending to the first destination.

In some embodiments, each of the set of ingress buffers is associated with a different virtual channel of an interconnect in which the hardware module functions as a node.

In some embodiments, the processing circuitry is configured to, prior to the selecting between the first ingress buffer and the second ingress buffer: as part of an arbitration scheme for arbitrating between the plurality of destinations for sending of data over the egress port, select the first destination as a next destination to which data is to be sent.

In some embodiments, a first bandwidth available for sending over the egress port exceeds a second bandwidth for receipt of data at the first ingress port.

In some embodiments, the hardware module is a node on an interconnect, wherein the first ingress port is a local ingress port for receiving the first set of data packets from the first subset of the plurality of source components, which are attached to the node, wherein the second ingress port is configured to receive the second set of data packets from a further node of the interconnect.

In some embodiments, the second ingress port is configured to receive data for delivery to at least one of the first subset of source components, wherein the processing circuitry is configured to provide this data for delivery to the at least one of the first subset of source components over a further egress port of the hardware module.

According to a second aspect, there is provided a device comprising the hardware module according to the first aspect or any embodiment thereof, wherein the device comprises the plurality of the source components and the first destination.

In some embodiments, the device comprises a plurality of instances of the hardware module connected together as nodes forming part of an interconnect, wherein each of the instances is configured to receive data from a different one or more of the source components.

In some embodiments, the device comprises a further hardware module connected to the first destination to which it is configured to output that data from the different ones of the source components connected to each of the plurality of instances of the hardware module, wherein an aggregate bandwidth of the different ones of the source components exceeds a bandwidth of the further hardware module for supplying data to the first destination.

In some embodiments, the device is an integrated circuit.

According to a third aspect, there is provided a method for receiving data from a plurality of source components and forwarding at least some of that data to a first destination, the method comprising: receiving a first set of data packets originating from a first subset of the source components and providing these to a first ingress buffer, wherein the first subset consists of one or more of the plurality of source components; receiving a second set of data packets originating from a second subset of the source components and provide these to a second ingress buffer, wherein the second subset of the source components comprises two or more source components, wherein the first subset consists of a different number of source components to the second subset; examining one or more second source identifiers in one or more of the second set of data packets to determine from which of the plurality of second source components each of the one or more of the second set of data packets originated from; and selecting between the first ingress buffer and the second ingress buffer from which to send data to the first destination in dependence upon the one or more second source identifiers so as to arbitrate between the plurality of source components for sending data to the first destination.

In some embodiments, the method comprises, upon selecting the second ingress buffer, sending a first of the second set of data packets that is located at the head of the second ingress buffer, wherein the one or more second source identifiers are source identifiers of packets of the second set of data packets that were sent from the second ingress buffer prior to the sending of the first of the second set of data packets.

In some embodiments, the method comprises storing an indication of a number of the source components for which data was last sent from the second ingress buffer, wherein the selecting between the first ingress buffer and the second ingress buffer comprises performing a weighted round robin between the first ingress buffer and the second ingress buffer, wherein the second ingress buffer is weighted by the number of the source components for which data was last sent from the second ingress buffer.

In some embodiments, the second ingress buffer belongs to a set of ingress buffers, each of which is configured to receive data originating from the second subset of the source components.

In some embodiments, the method comprises, for each of the second subset of source components, storing an indication of which of the set of ingress buffers data originating from the respective source component was last sent, wherein the indication of the number of source components is given by a number of the second subset of the source components for which the respective indication of which of the set of ingress buffers data originating from the respective source component was last sent specifies the second ingress buffer.

In some embodiments, a first of the first set of data packets that is located at head of the first ingress buffer originated from a first of the first subset of source components identified by a first source identifier, wherein the examining the one or more second source identifiers comprises examining a second source identifier in a first of the second set of data packets that is located at the head of the second ingress buffer, wherein the method comprises selecting the first of the second set of data packets for sending in dependence upon the second source identifier in the first of the second set of data packets and the first source identifier.

In some embodiments, the method comprises determining the first source identifier by examining the first source identifier in the first of the first set of data packets.

In some embodiments, the method comprises storing an identifier of one of the plurality of source components for which data was most recently sent to the first destination, wherein the selecting between the first ingress buffer and the second ingress buffer comprises selecting a next one of the plurality of source components which follows the identified one of the plurality of source components in a sequence.

In some embodiments, the selecting between the first ingress buffer and the second ingress buffer comprises applying a round robin scheme between the plurality of sources components.

In some embodiments, the first subset of the source components consists of a single source component, wherein the first ingress buffer is dedicated to hold data packets originating from the single source component.

In some embodiments, the method comprises outputting data to a plurality of destinations including the first destination.

In some embodiments, some of the first set of data packets are for dispatch to different ones of the plurality of destinations, wherein the method comprises: examining a destination identifier in the one of the first set of data packets that is at the head of the first ingress buffer; and in response to determining that the destination identifier identifies the first destination, performing the selecting between the first ingress buffer and the second ingress buffer based on the one or more second source identifiers.

In some embodiments, the second ingress buffer is one of a set of ingress buffers, each of which is for storing data originating from the second subset of the source components, wherein each of the set of ingress buffers is dedicated for storing data for sending to a different destination of the plurality of destinations, wherein the second ingress buffer is dedicated for storing data for sending to the first destination.

In some embodiments, each of the set of ingress buffers is associated with a different virtual channel of an interconnect in which the hardware module functions as a node.

In some embodiments, the method comprises, prior to the selecting between the first ingress buffer and the second ingress buffer: as part of an arbitration scheme for arbitrating between the plurality of destinations for sending of data, selecting the first destination as a next destination to which data is to be sent.

In some embodiments, a first bandwidth available for sending data to the first destination exceeds a second bandwidth for receipt of data from the first subset of source components.

In some embodiments, the method is implemented in a node of an interconnect, wherein the first set of data packets are received on a local ingress port from the first subset of the plurality of source components, which are attached to the node, wherein the second set of data packets are received from a further node of the interconnect.

In some embodiments, the method comprises, receiving data for delivery to at least one of the first subset of source components, wherein the method comprises providing this data for delivery to the at least one of the first subset of source components.

In some embodiments, the method is implemented in a hardware module of a device, wherein the device comprises the plurality of the source components and the first destination.

In some embodiments, the device comprises a plurality of instances of the hardware module connected together as nodes forming part of an interconnect, wherein each of the instances is configured to independently perform the steps of the method.

In some embodiments, the device comprises a further hardware module connected to the first destination to which it is configured to output that data from the different ones of the source components connected to each of the plurality of instances of the hardware module, wherein an aggregate bandwidth of the different ones of the source components exceeds a bandwidth of the further hardware module for supplying data to the first destination.

In some embodiments, the device is an integrated circuit.

According to a fourth aspect, there is provided a computer program comprising a set of computer readable instructions, which when executed by at least one processor, cause a method to be performed, the method comprising: examining one or more second source identifiers in one or more of a second set of data packets held in a second ingress buffer to determine from which of a second subset of a plurality of source components each of the one or more of the second set of data packets originated from, wherein the second subset of the plurality of source components comprises two or more source components; and selecting between a first ingress buffer and the second ingress buffer from which to send data to a first destination in dependence upon the one or more second source identifiers so as to arbitrate between the plurality of source components for sending data to the first destination, wherein the first ingress buffer comprises a first set of packets originating from a first subset of the plurality of source components, wherein the first subset consists of a different number of source components to the second subset, wherein the first subset consists of one or more of the plurality of source components.

In some embodiments, the method comprises any of the steps included in the embodiments of the method according to the third aspect.

According to a fifth aspect, there is provided a non-transitory computer readable medium storing the computer program according to the fourth aspect.

BRIEF DESCRIPTION OF DRAWINGS

For a better understanding of the present invention and to show how the same may be carried into effect, reference will now be made by way of example to the accompanying Figures in which.

DETAILED DESCRIPTION

Embodiments of the application relate to a hardware module for receiving data packets from multiple sources and forwarding those packets to destinations. As will be described in detail later, a plurality of such hardware modules may be implemented as switches of a network on chip for providing data packets between components of the chip. The components of the chip may include a processing unit. An example of a chip comprising a processing unit (in the form of a multi-tile processing unit) is described in more detail in our earlier U.S. patent application Ser. No. 16/276, 834, which is incorporated by reference.

Figure 1A:
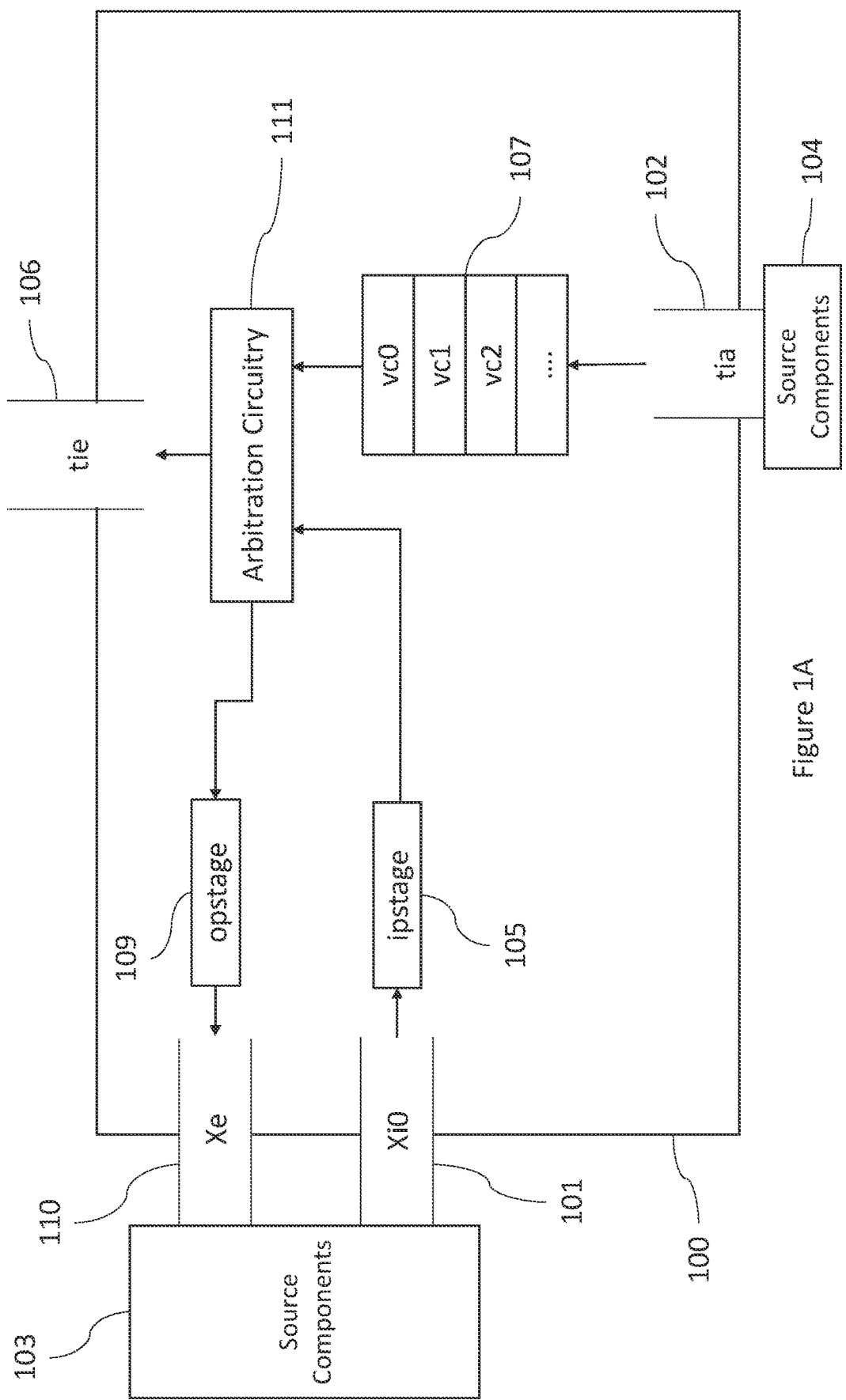
FIG. 1A illustrates an example hardware module having a single ingress buffer for receiving data from locally attached source components.
Figure 4:
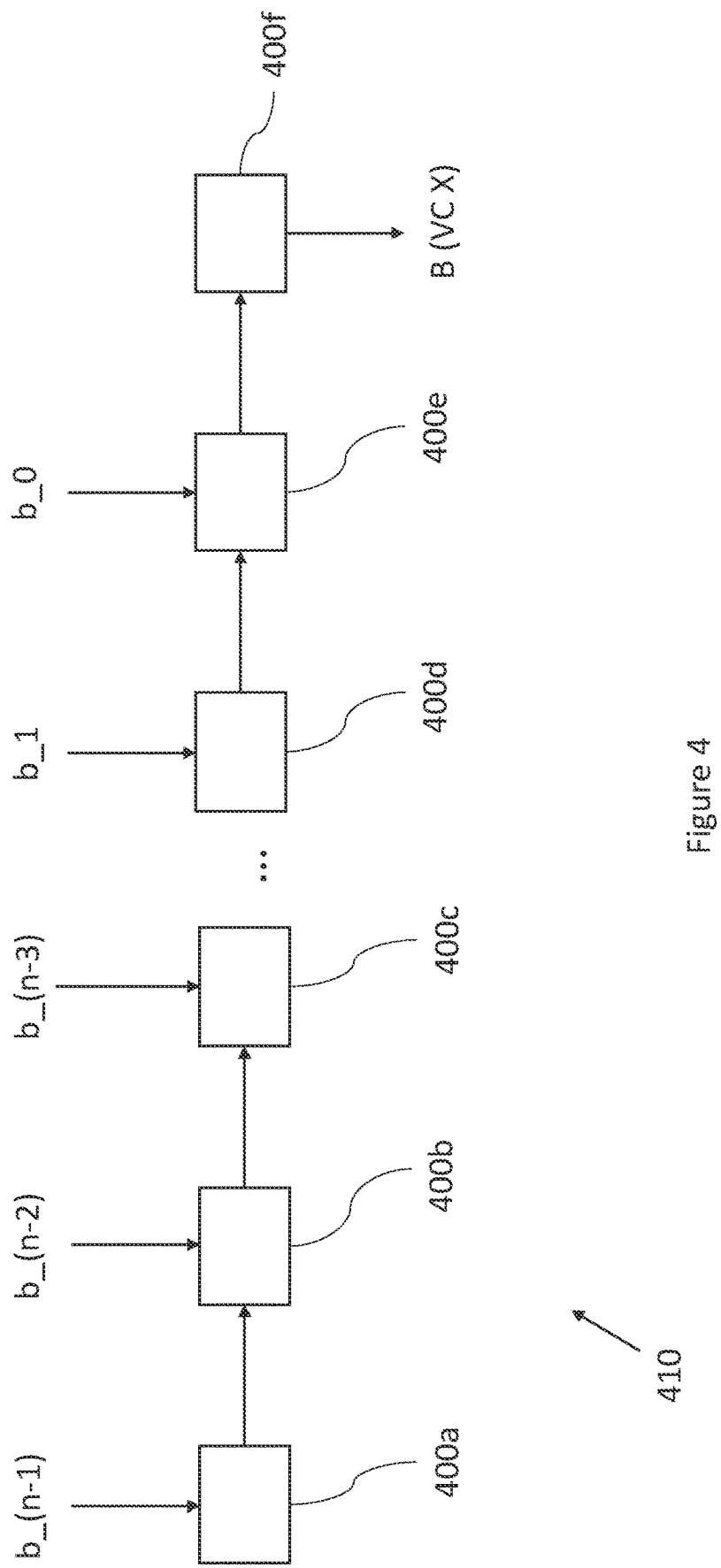
FIG. 4 illustrates an example interconnect in which multiple hardware modules function as nodes/switches of the interconnect.

Reference is made to FIG. 1A, which illustrates an example of a hardware module 100 according to embodiments of the application. The hardware module 100 comprises a first ingress port 101 (labelled as "Xi0" in FIG. 1A) for receiving data packets from one or more source components 103. The one or more source components 103 may be locally attached source components 103. The hardware module 100 also comprises a second ingress port 102 (labelled as "tia" in FIG. 1A) for receiving data packets originating from multiple further source components 104. Although the multiple further source components 104 are shown as being attached directly to the hardware module 100, in at least some embodiments the multiple source components are connected to the hardware module 100 via additional intermediate modules (as is shown in FIG. 4).

A first ingress buffer 105 is provided for storing data packets received at the hardware module 100 on the first ingress port 101. The data packets stored in this buffer 105 are for dispatch from the hardware module 100 to one or more destinations over the egress port 106. The hardware module 100 comprises additional buffers 107 for storing data packets received at the hardware module 100 on the second port 102. Each of these additional buffers 107 may considered to operate as a second ingress buffer which stores data packets from multiple destinations.

Each of these additional buffers 107 is associated with a different destination component to which data is to be sent. Each data packet received on the port 102 comprises a destination identifier in the header of the packet. Circuitry of the hardware module 100 is configured to, when a data packet is received on port 102, inspect the destination identifier in the header of the packet, and store the data packet in one of the buffers 107 that is associated with the identified destination. Each of these buffers 107 is labelled as vc0, vc1, vc2, etc, which represents that each of the buffers 107 is associated with a different destination. Each of the source components 103 attached to the module 100 constitutes one of those different destinations such that, when a data packet arrives from the source components 104 for delivery to one of the components 103, that data is delivered to the one of the buffers 107 associated with the one of the components 103. The circuitry 111 delivers the data from the one of the buffers to the egress buffer 109 from where it is delivered over a further egress port 110 to the relevant one of the source components 103.

Each of the destinations to which the module 100 is configured to send data is associated with a virtual channel. Hence, each of the buffers 107 is associated with a virtual channel, with the virtual channel being labelled as vc0, vc1, etc. As is described in more detail with reference to FIG. 5, the use of virtual channels for delivery of data to different destinations prevents head of line blocking.

The hardware module 100 comprises arbitration circuitry 111, which is processing circuitry for determining from which of buffers 105, 107, data is to next be sent. The arbitration circuitry 111 first selects one of the destinations in relation to which data is to be sent. In other words, the arbitration scheme first selects one of the destination components as the next component to which data is to be sent. The selected destination may be one of the components 103 or may be a remote destination accessible over port 106. The selection of the destination is performed using a round robin between the destinations. For example, if the last data that was sent was from buffer vc0 then the next data to be sent is from buffer vc1.

Once the destination to which data is to be sent is selected, the arbitration circuitry 111 then selects between the sending of data from the first ingress buffer 105 or the one of the further buffers 107 that is associated with the selected destination. The selection between the first ingress buffer 105 and the one of the further buffers 107 is performed in dependence upon the source components from which data packets in those buffers originated. In some embodiments, the source identifier of the packet at the head of the one of the further buffers 107 is used to perform a simple round robin between the sources. Such example embodiments are described below with respect to FIGS. 1B to 1D. In other embodiments, the arbitration between sources is achieved by using the examination of the source identifiers in the one of the further buffers 107 to provide statistics for a weighted round robin involving the first ingress buffer 105 and the one of the further buffers 107. Such an example embodiment is described below with respect to FIG. 1E.

Figure 1B:
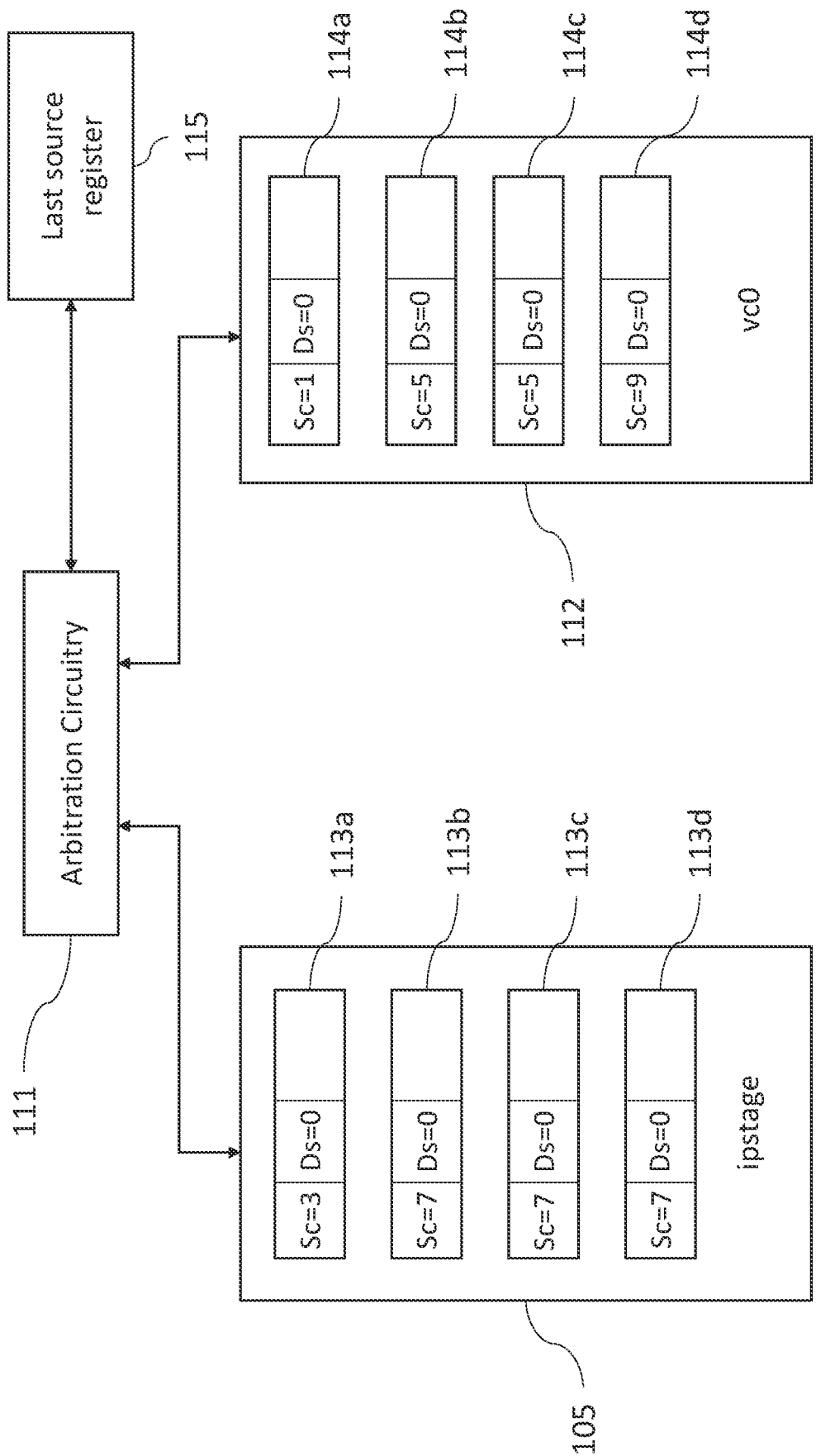
FIG. 1B illustrates an example embodiment in which the arbitration circuitry selects between the single ingress buffer, containing data from multiple sources, and a single virtual channel buffer.

Reference is made to FIG. 1B, which illustrates an example as to how the selection between the first ingress buffer 105 and a second ingress buffer 112 may be made. The second ingress buffer 112 may be one of the further buffers 107 discussed above with respect to FIG. 1A. The second ingress buffer 112 is, in that case, associated with a destination (Ds=0) that is selected by applying the round robin between the destinations. In this example, the example data packets shown in the first ingress buffer 105 are for dispatch to the same destination (Ds=0) as the data packets in the second ingress buffer 112.

The first ingress buffer 105 comprises a plurality of data packets 113a-d. The second ingress buffer 112 comprises a plurality of data packets 114a-d. Each of the data packets 113a-d, 114a-d comprises a header and a payload. Each header comprises a source identifier (which identifies which of the source components 103, 104 the packet originated from) and a destination identifier (which identifiers which of the destination components the data packet is for delivery to). The source identifiers are indicated in FIG. 1B as "Sc=_", whereas the destination identifiers are indicated as "Ds=_". Each of the buffers 105, 112 may be a first in, first out (FIFO) buffer, with the data packets at the heads of each of the buffers 105, 112 being the next packets to be transmitted from those buffers 105, 112.

The circuitry 111 selects one of the buffers 105, 112 by arbitrating between the source components. This may be achieved by applying a round robin scheme between the source components to select one of the source components for which data originating from that source component is next to be sent. The arbitration circuitry 111 has access to a register 115, which stores an indication of the originating source component of the data packet that was last sent from one of the buffers 105, 112. This identified source component may be referred to as the last source component and the indication in register 115 referred to as the last source identifier. This indication is used by the circuitry 111 to select the one of the buffers 105, 112 from which the next data packet is to be sent. The circuitry 111 applies an arbitration scheme such that the next packet of the two packets at the heads of the buffers 105, 112 to be sent is: the packet with the next highest source identifier or, if no such packet with a higher source identifier is determined, the packet with the lowest source identifier. The buffer selected as a result of this arbitration scheme is, therefore, the one of the buffers 105, 112 containing that packet. After sending the data packet from that selected buffer 105, 112, the circuitry 111 then updates the indication in the register 115 with the source identifier of the data packet just sent.

In the example of FIG. 1B, the one or more source components 103 comprise at least two source components (labelled as sources Sc=3 and Sc=7), and the further source components 104 comprise at least three source components (labelled as sources Sc=1, Sc=5, and Sc=9). The first ingress buffer 105 stores data packets originating from sources Sc=3 and Sc=7, whereas the second ingress buffer 112 stores data packets originating from sources Sc=1, Sc=5, and Sc=9.

Suppose that the register identifies the originating source component of the data packet that was last sent from one of the buffers 105, 112, as being source Sc=1. The circuitry 111 inspects the source identifiers of the packets 113a, 114 that are at the heads (i.e. which are the next to be sent from that buffer) of each of the buffers 105, 112. The packet 113a has a source identifier of source Sc=3, whereas the packet 114a has a source identifier of source Sc=1. Since the source identifier of packet 113a is higher than the identifier from register 115 (whereas the source identifier of packet 114a is equal to the identifier from register 115), the arbitration circuitry 111 causes the packet 113a to be sent over the egress port 106. The arbitration circuitry 111 then causes the identifier in the register 115 to be updated to an identifier of the source (i.e. source Sc=3) from which packet 113a originated. The arbitration circuitry 111 then selects the packet 113b (since this has the next highest source identifier, i.e. Sc=7) as the next packet to send. After sending this packet 113b, the circuitry 111 then causes the identifier in the register 115 to be updated to an identifier of the source (i.e. source Sc=7) from which packet 113b originated. Since neither of the packets 113c, 114a now at the heads of the buffers 105, 112 have higher source numbers than the source number (Sc=7) in register 115, the circuitry 111 then selects the one of the packets—i.e. packet 114a with source number Sc=1—that has the lowest source number. After sending packet 114a, the order of packet sends continues: packet 114b, packet 113c, packet 114c, packet 113d, packet 114d.

FIG. 1B illustrates an embodiment in which the first ingress buffer 105 comprises packets originating from multiple sources. In this case, the circuitry 111 inspects the source identifiers of the packets held in the buffer 105 in addition to the source identifiers of the packets held in buffer 112. However, in some embodiments the buffer 105 may be dedicated to hold packets originating from a single source. In such an embodiment, it may be unnecessary for the circuitry 111 to individual inspect the source identifiers of packets sent from the buffer 105 for the purposes of arbitration.

Figure 1C:
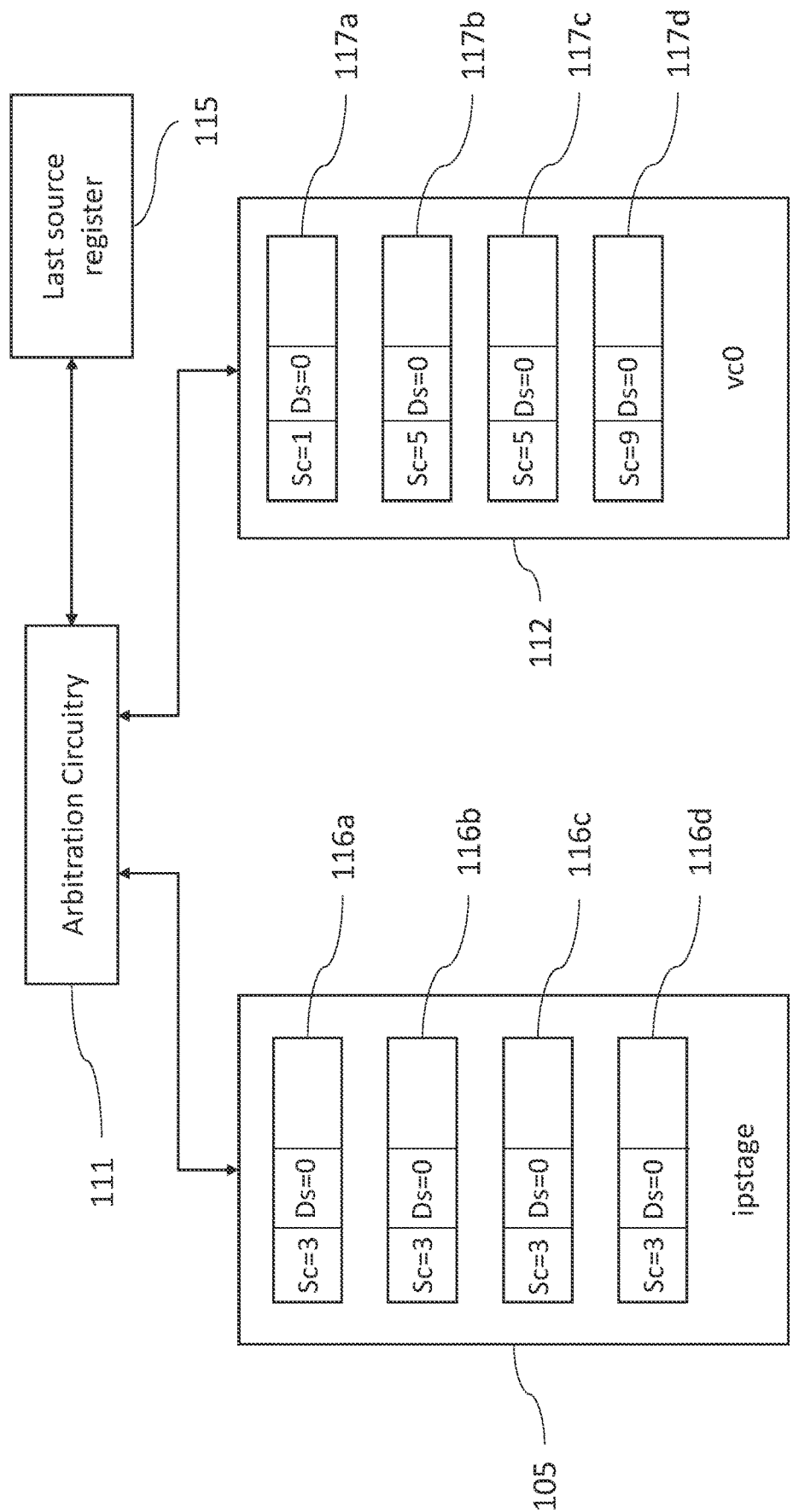
FIG. 1C illustrates an example embodiment in which the arbitration circuity selects between the single ingress buffer, containing data from a single source, and a single virtual channel buffer.

Reference is made to FIG. 1C, which illustrates an embodiment in which the buffer 105 comprises data packets 116a-d originating from a single source component, rather than from multiple source components. In this case, the circuitry 111, when performing the selection between buffers 105, 112, need not analyse the source identifiers in the packets 116a-116d, since the buffer 105 is dedicated to hold packets from a single source component. The circuitry 111 is provided with access to an identifier associated with this single source component, which is used for performing the arbitration.

In the example of FIG. 1C, the circuitry 111 examines the source identifier in the packet 117a that is at the head of the buffer 112. The circuitry 111 compares this examined source identifier to the last source identifier from register 115 and the source identifier associated with the buffer 105. The circuitry 111 determines which (if any) of the examined source identifier and the source identifier associated with the buffer 105 is the next highest after the last source identifier, and causes the one of the packets 116a, 117a with this next highest source identifier to be sent next over the egress port 106. If neither of the examined source identifier and the source identifier associated with the buffer 105 is higher than the last source identifier, the circuitry 111 causes the one of the packets 116*a*, 117*a* with the lowest source identifier to be sent next over the egress port 106.

Figure 1D:
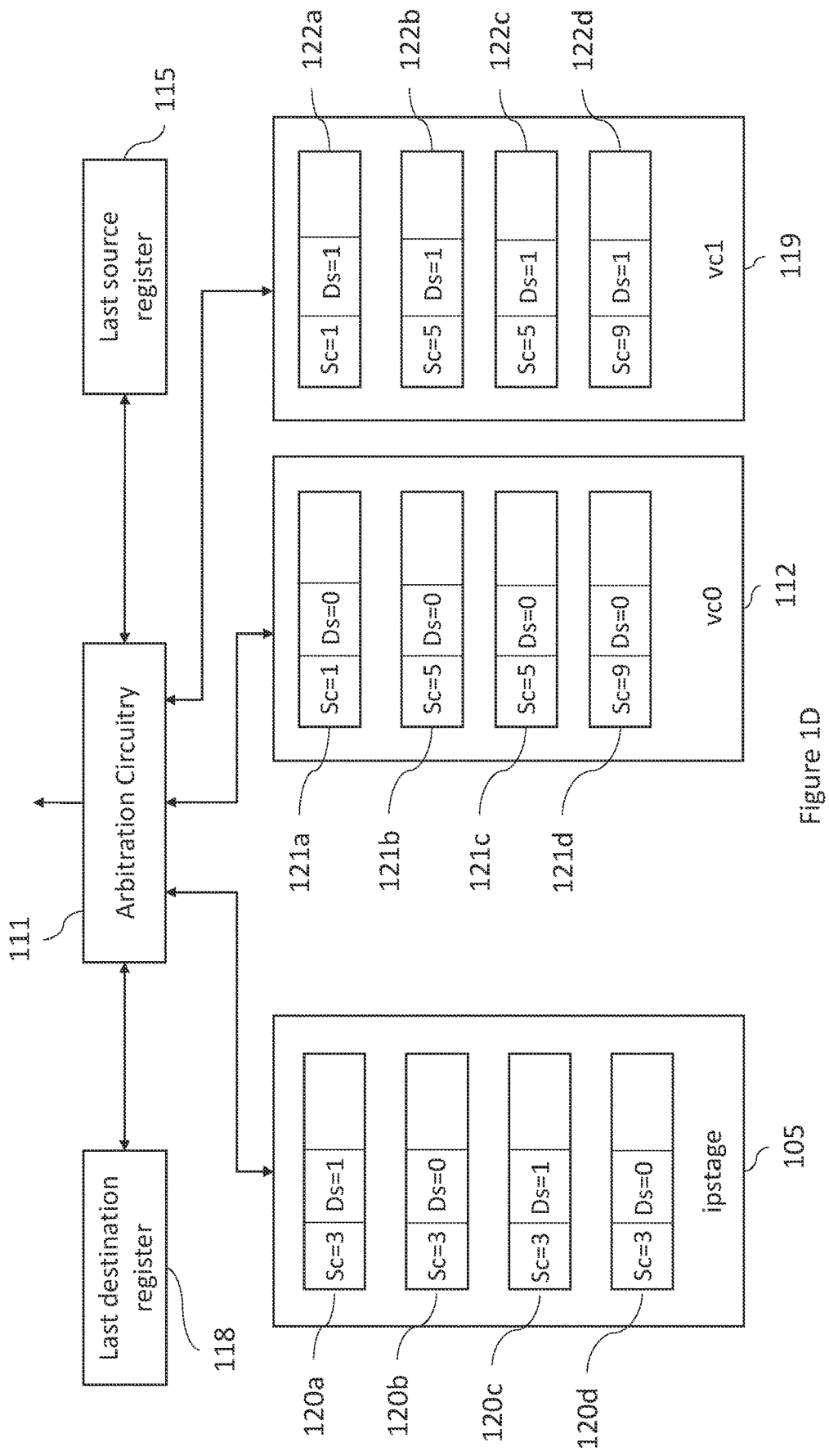
FIG. 1D illustrates an example embodiment in which the arbitration circuity selects between a single ingress buffer, containing data from a single source, and multiple virtual channel buffers.

Reference is made to FIG. 1D, which illustrates how the scheme for the selection of the buffer from which data is sent based on the source of the originating data (i.e. source arbitration) may be combined with the scheme for the selection of the buffer based on the destination to which data is to be sent (i.e. destination arbitration).

As described with respect to FIGS. 1A and 1B, the second ingress buffer 112 may be one of a plurality of buffers 107 for storing data received on the second ingress port 102, where each of these buffers 107 stores data that is for delivery to a different destination. In this case, the circuitry 111 arbitrates between the sending of data to different destinations, in addition to arbitrating between the sending of data from different sources. The step of selecting the destination to which a data packet is to be sent occurs prior to the step of selecting the source from which the data is to be sent. Once the destination to which data is next to be sent has been determined by the circuitry 111, the circuitry 111 then selects between ones of the buffers 105, 107 that have data packets at their heads for delivery to that destination. The selection between those ones of the buffers 105, 107 is performed based on the source identifier in the packets at the heads of each of the buffers 105, 107.

To perform the arbitration based on the destination, the hardware module 100 comprises a last destination register 118, which indicates the destination that was last selected for the sending of a data packet over egress interface 106. The circuitry 111 performs a round robin between the destinations. This is implemented by selecting, if it exists, the next highest valid destination identifier following the destination identifier stored in the register 118. If the destination identifier stored in register 118 is the highest identifier of any of the destinations for which data is available to be sent, the circuitry 111 selects the lowest destination identifier.

When the circuitry 111 selects a destination identifier, if there is no data to send to this destination—either at the head of the first ingress buffer 105 or the head of the one of the further ingress buffers 107 associated with that destination—then the circuitry 111 selects the next destination without causing any data to be sent over the egress port 106 to that destination. If there is data to be sent to that destination at the head of only one of the buffers 105, 107, then the circuitry sends data from that buffer that has data to send to that destination, without performing a selection between the buffers 105, 107 on the basis of the source from which that data originated. If there is data to be sent to the selected destination at the heads of two of the buffers 105, 107, then the circuitry 111 selects between the two buffers on the basis of the source components from which that data in the two buffers originated.

The last source register 115 stores, for each destination to which data is sent over egress port 106, the source identifier of the originating source component from which data was last sent to that destination. Therefore, arbitration between sources is performed on a per destination basis. In this way, the hardware module 100 supplies data from different sources to a given destination with fairness between each of the sources.

The example in FIG. 1D illustrates the second ingress buffer 112 and a third ingress buffer 119, both of which are ones of the buffers 107 for receiving data via the second ingress port 102. It would be appreciated that, although FIG. 1D shows data for dispatch to only two destinations, in other embodiments, there may be data packets for more than two destinations.

As an example, assume that the circuitry 111 is to send a data packet to destination Ds=0 first. The circuitry 111 examines the packet 120*a* at the head of the first ingress buffer 105. Since the first packet 120*a* comprises an identifier of destination Ds=1, the circuitry 111 does not perform the selection between buffers 105, 112 on the basis of the source identifier. The circuitry 111 causes the packet 121*a* to be sent over the egress port 106 in response to determining that the destination identifier (Ds=0) in packet 120*a* does not match the selected destination identifier (Ds=0).

After sending the packet 121*a*, the circuitry 111 updates the last source identifier for Ds=0 in the register 115 to the source identifier for packet 121*a* (i.e. Sc=1). The circuitry 111 also updates the last destination register 118 to Ds=0. The circuitry 111 then selects the next destination to which data is to be sent to Ds=1. The circuitry 111 examines the packet 120*a* at the head of the first ingress buffer 105. Since the destination identifier for this packet 120*a* is Ds=1, the circuitry 111 selects between sending packet 120*a* from buffer 105 and sending packet 122*a* from buffer 119. This selection is performed in dependence upon the source components from which those packets originate. The circuitry 111 obtains the identifier of the last source component from which a data packet was sent to Ds=1 from the register 115. The circuitry 111 applies the round robin scheme between the sources as described with respect to FIGS. 1B and 1C and sends the one of the packets 120*a*, 122*a* that has the source number that is the next highest (or the lowest if the source identifier from register 115 is higher than the source identifiers of the packets 120*a*, 122*a*) after the source identifier obtained from register 115. Suppose that the last source identifier for Ds=1 obtained from register 115 is Sc=1. In this case, the next highest of the source identifiers of packets 120*a*, 122*a* is Sc=3 and, therefore, packet 120*a* from buffer 105 is selected for dispatch over the egress port 106.

Following the sending of the packet 120*a*, the circuitry 111 updates the last source identifier for Ds=1 in the register 115 with Sc=3. The circuitry 111 also updates the last destination identifier in register 118 to Ds=1. The circuitry 111 then selects Ds=0 as the next destination to which data is to be sent by the circuitry 111. The circuitry 111 then selects between sending packet 120*b* from buffer 105 or packet 121*b* from buffer 112. Since the last source component for Ds=0 is Sc=1, the circuitry 111 then selects the packet 120*b*—which has the next highest source identifier (i.e. Sc=3) of the two packets 120*b*, 121*b*—for sending over port 106.

The circuitry 111 continues with the sending of packets 120*a-d*, 121*a-d*, 122*a-d* according to the described scheme for arbitrating between sources and destinations.

FIGS. 1B to 1D illustrate examples in which the circuitry 111 selects a next source to send data on the basis of a stored indication of the last source that sent data over port 106. In some embodiments, the circuitry 111 may rely on a different type of stored information to select a buffer from which to send data. Specifically, in some embodiments the hardware module 100 may store, for each source from which data is sent from buffers 107 (i.e. the remote sources), an indication of the destination to which data originating from the respective source was last sent. These indications are used to weight each of the buffers 107 such that a weighted selection may be performed between one of the buffers 107 comprising data for a particular destination and a first ingress buffer 105.

Figure 1E:
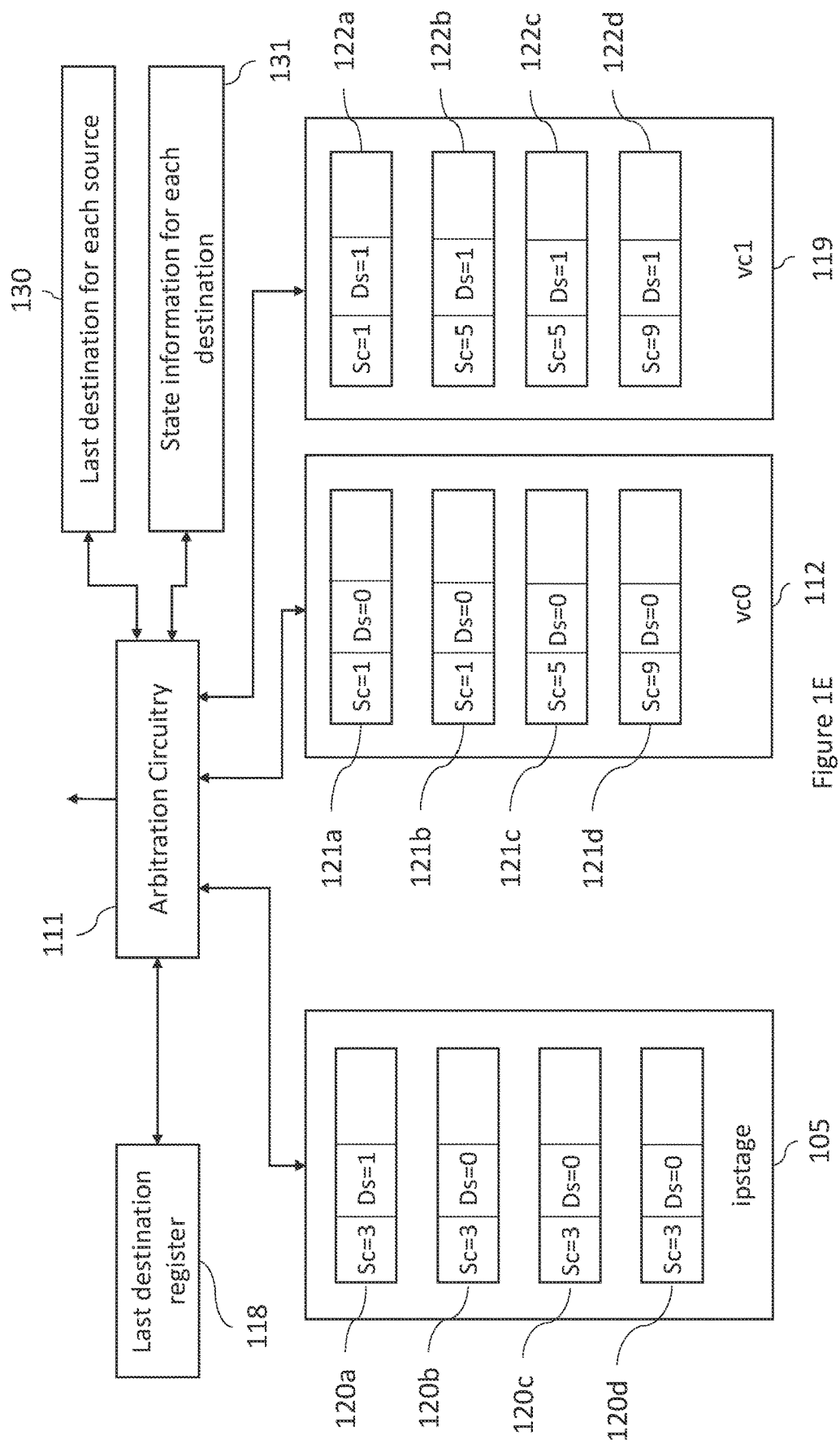
FIG. 1E illustrates a further example embodiment in which the arbitration circuity selects between a single ingress buffer, containing data from a single source, and multiple virtual channel buffers.

Reference is made to FIG. 1E, which illustrates an embodiment in which a weighted selection is performed between buffer 105 and a selected one of buffers 112, 119. In this example, a register 130 is part of the hardware module 100 and stores, for each remote source 104 (i.e. source from which data is received on port 102), an indication of the destination to which data originating from that source was last sent over port 106. Since the data from the remote sources 104 is stored in buffers 107, each such indication amounts to an indication of which of the buffers 107, data originating from the respective source was last sent from. The circuitry 111 selects between the destinations to send data in accordance with a round robin arbitration scheme. This may be done using the register 118 as described above with respect to FIG. 1D. Once a destination is selected, the circuitry 111 then selects between the buffers (which includes one of buffers 107 and may include buffer 105) having data for sending to that destination. The selection between these buffers is performed by applying a weighted round robin between the buffer 105 and the one of the buffers 107 associated with the destination, where the buffer 105 is assigned a weight of one and the one of the buffers 107 associated with the destination is assigned a variable weight. The variable weight assigned to the one of the buffers 107 is given by the number of remote sources 104 that last sent data to the destination associated with that buffer. This number of remote sources 104 is derivable from the indications held in register 130. Specifically, for each destination, the number of remote sources 104 is given by the number of last destination indicators in the buffer 130 that indicate that destination. It is noted that, in embodiments, the minimum weight for each of the buffers 107 is one, such that if there are zero sources indicated in the register 130 for which originating data was last from a particular one of buffers 107, the circuitry 111 applies a weight of one for that buffer.

To apply the weighted round robin between the buffers having data to send to a particular destination, a register 131 comprising state information is provided in the module 100. The register 131 stores state information identifying, for each destination, which of the buffers (i.e. the first ingress buffer 105 or one of the buffers 107) is the next to provide data over port 106 to that destination. When circuitry 111 has sent a first data packet over port 106 to a first destination, the circuitry 111 then selects a further destination for sending data to. When the circuitry 111 again selects the first destination for sending data to, the circuitry 111 uses the stored state information for the first destination to select from which buffer, a next data packet should be sent over the port 106 to the first destination.

In the case that, for a particular destination, the buffer which is indicated by the associated state information as being the next from which data is to be sent is one of buffers 107, the circuitry 111 also stores as part of the state information for this destination, a count of the number of data packets that have been consecutively sent from the currently selected one of the buffers 107 to the respective destination. After sending a data packet from the one of the buffers 107 associated with the destination and updating its associated count in register 131, the circuitry 111 compares the associated count for the one of the buffers 107 to the weight for that one of the buffers 107. Once the circuitry 111 determines that the count for the one of the buffers 107 matches its associated weight, the circuitry 111 updates the state information for the destination to indicate the buffer 105 as being the next buffer from which data is to be sent to the destination.

In the example of FIG. 1E, suppose that data from source Sc=1 was last sent from buffer 112, whereas data from sources Sc=5 and Sc=9 was last sent from buffer 119. These indications are held in register 130. Since data originating from two sources (i.e. Sc=5 and Sc=9) was last sent from buffer 119, buffer 119 (and its associated destination) has a weight of two (which is implicit from the indications in register 130). On the other hand, since data originating from one source (i.e. Sc=1) was last sent from buffer 112, buffer 112 has a weight of one (which is implicit from the indication in register 130). Suppose further that for destination Ds=0, the associated state information for Ds=0 in register 131 indicates that a data packet is next to be sent from buffer 112, and that for destination Ds=1, the associated state information for Ds=1 in register 131 indicates that a data packet is next to be sent from buffer 119.

The circuitry 111 examines the packet 120*a* at the head of buffer 105 and determines that this packet 120*a* is for dispatch to Ds=1. If the circuitry 111 is configured to next send a data packet to Ds=1, then the circuitry 111 selects between the buffer 105 and the buffer 119 for sending a data packet over port 106. Since the state information in register 131 indicates that the next data packet to be sent over port 106 to destination Ds=1 is from buffer 119, the circuitry 111 causes the packet 122*a* at the head of buffer 119 to be sent over the port 106. The circuitry 111 then updates the state information in register 131 to indicate that one packet has been consecutively sent from buffer 119. The circuitry 111 also updates the last destination for the source Sc=1 held in register 130 to indicate that data originating from Sc=1 was last sent to destination Ds=1 (i.e. from buffer 119).

The update to the last destination indicator for source Sc=1 has the effect of altering the weight for buffer 119. Since data originating from three sources (i.e. Sc=1, Sc=5, Sc=9) was now last sent from buffer 119, buffer 119 now has a weight of three. For buffer 112, there are now zero sources for which data was last sent from this buffer 112. As described above, in the case that zero sources last from a buffer, such a buffer is implied to have a weight of one. Therefore, buffer 112 is indicated to have a weight of one by the indications in register 130.

Once the circuitry 111 has sent packet 122*a*, the circuitry 111 selects Ds=0 as the next destination to which data is to be sent. Since the packet 120*a* at the head of the buffer 105 is for delivery to Ds=1, rather than to Ds=0, the buffer 105 is excluded from the weighted selection performed by the circuitry 111. As a result, the circuitry 111 selects the buffer 112 and sends the packet 121*a* at the head of this buffer 112 over the port 106. The circuitry 111 then updates the register 130 to indicate that data originating from Sc=1 was last sent to destination Ds=0 (i.e. from buffer 112). This has the effect of again adjusting the weightings such that buffer 112 has a weight of one, whilst buffer 119 has a weight of two.

After sending the packet 121*a*, one packet has been consecutively sent from buffer 112 without the count being reset and, therefore, the count value is equal to the current weight for buffer 112. Since the count value is equal to the weight, the circuitry 111 updates the state information in the register 131 to indicate that the next buffer for destination Ds=0 is buffer 105. The circuitry 111 also resets the count value for buffer 112 to zero.

Once the circuitry 111 has sent packet 121*a*, the circuitry 111 selects Ds=1 as the next destination to which data is to be sent. The circuitry 111 examines the state information for Ds=1 and determines that a packet was last sent to this destination from buffer 119 and that one packet (i.e. packet 122a) has been consecutively sent from buffer 119. The circuitry 111 compares the number of consecutively sent packets (i.e. one in this case) to the weight (i.e. two in this case) that is implicit from the indications in register 130. Since the number of consecutively sent packets is less than the weight, the result of the weighted selection by the circuitry 111 is that the buffer 119 is again selected as the next buffer from which to send a data packet to Ds=1. The circuitry 111, therefore, causes packet 122b to be sent from buffer 119 over the port 106. The circuitry 111 updates the state information in register 131 to indicate that two packets have been consecutively sent from buffer 119. Since the count of packets sent from buffer 119 is now equal to the weight for buffer 119 (i.e. two), the circuitry 111 resets the count and updates the state information in register 131 to indicate that the next buffer for Ds=1 is buffer 105.

Once the circuitry 111 has sent packet 122b from buffer 119, the circuitry 111 selects Ds=0 as the next destination to which is to be sent. The buffer 105 is indicated in the state information as being the next buffer for destination Ds=0. The circuitry 111 examines the packet 120a at the head of the buffer 105 and, in response to determining that this packet is not for delivery to destination Ds=0, instead selects buffer 112 and sends packet 121b from this buffer 112 over port 106. Since the weight of buffer 112 is only one, in response to the sending of a single packet from buffer 112, the circuitry 111 causes the state information for Ds=0 to indicate the next buffer for sending to Ds=0 to be buffer 105.

After sending of the packet 121b, the circuitry 111 selects Ds=1 as being the next destination to which data is to be sent. In response to determining that the state information for Ds=1 indicates that buffer 105 is the next buffer from which data is to be sent to Ds=1, the circuitry 111 causes packet 120a at the head of buffer 105 to be sent over the port 106. After sending packet 120a, circuitry 111 causes the state information to be updated to indicate buffer 119 as the next buffer for Ds=1.

After sending packet 120a, the circuitry 111 selects Ds=0 as being the next destination to which data is to be sent. In response to determining that the state information for Ds=0 indicates that buffer 105 is the next buffer from which data is to be sent to Ds=0, the circuitry 111 causes packet 120b at the head of buffer 105 to be sent over the port 106. After sending packet 120b, circuitry 111 causes the state information to be updated to indicate buffer 112 as the next buffer for Ds=0.

The circuitry 111 continues to send packets from buffers 105, 112, 119 in accordance with the described scheme.

FIGS. 1A illustrates an example in which the hardware module 100 has a single ingress buffer 105 for receiving data packets via a single ingress port 101 from one or more locally attached source components 103. In some embodiments, there may be a plurality of ingress buffers for receiving data from locally attached source components. In this case, the selection process that is performed in order to select between the buffers from which data is to be sent over the egress port 106 also involves selecting between these ingress buffers holding data received from locally attached source components.

Figure 2A:
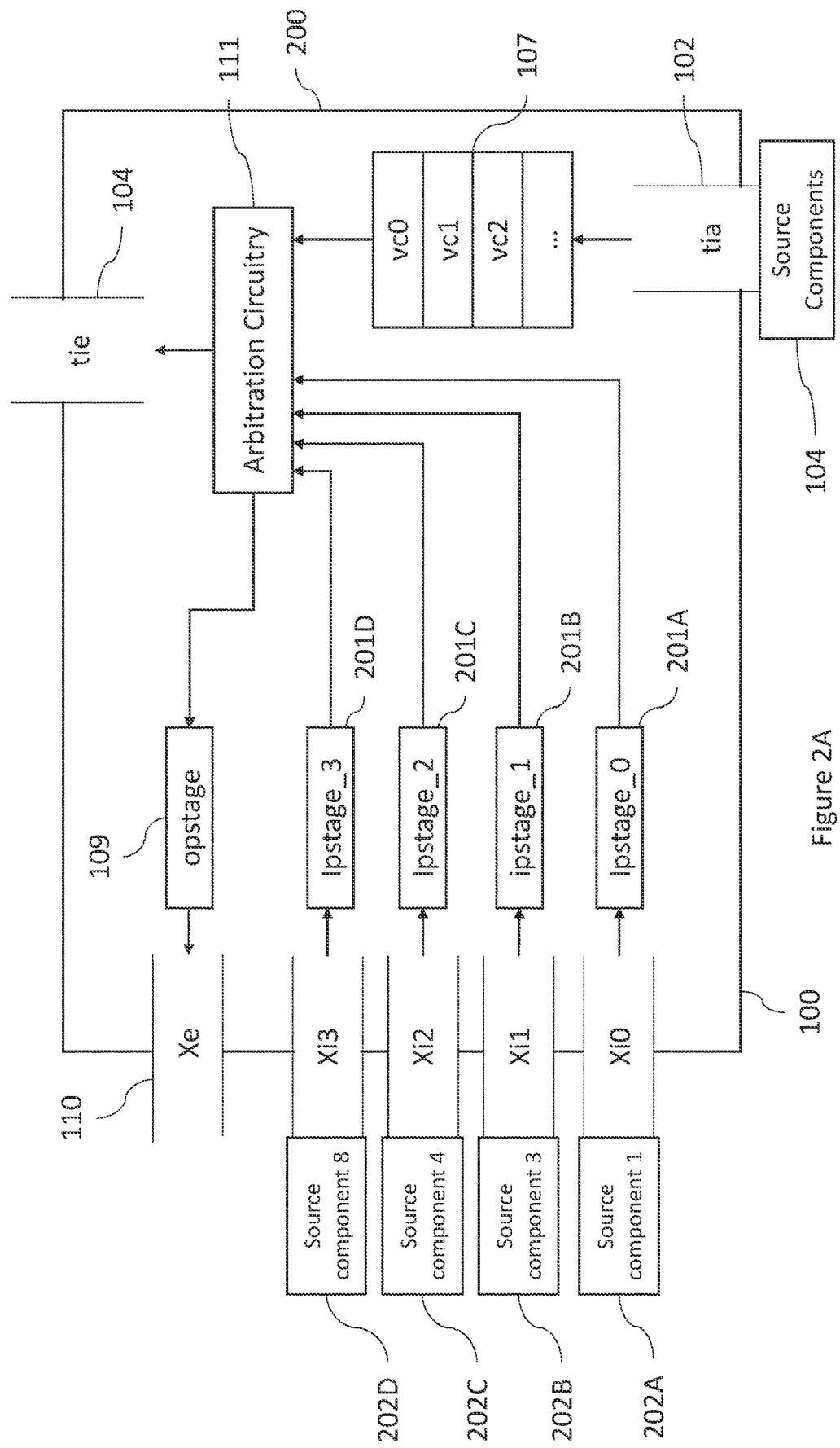
FIG. 2A illustrates an example hardware module having multiple ingress buffers for receiving data from locally attached source components.

Reference is made to FIG. 2A, which illustrates an embodiment of the hardware module 200 comprising a plurality of ingress buffers 201A-D for receiving data from the source components 202A-D via ingress ports xi0-3. Each of the source components 202A-D is locally connected to the hardware module 200 and is configured to provide data packets over an associated one of the ingress ports xi0-3 to an associated one of the ingress buffers 201A-D. Each ingress buffer 201A-D is dedicated to hold data originating from its associated source component 202A-D. The ingress buffer 201A may be labelled as a first ingress buffer in this embodiment.

In the case that there are four ingress buffers 202A-D, the selection between buffers from which to send a data packet that is performed on the basis of the source of the data packets at the heads of the buffers may involve performing selection between up to five buffers. In this case, the selection is performed between one of the buffers 107 which holds data for delivery to a given destination and any of the buffers 201A-D having a data packet at its head that is also for delivery to this same destination. The circuitry 111 arbitrates on the basis of the originating source components to determine from which of these buffers, data is to be sent over port 104.

Figure 2B:
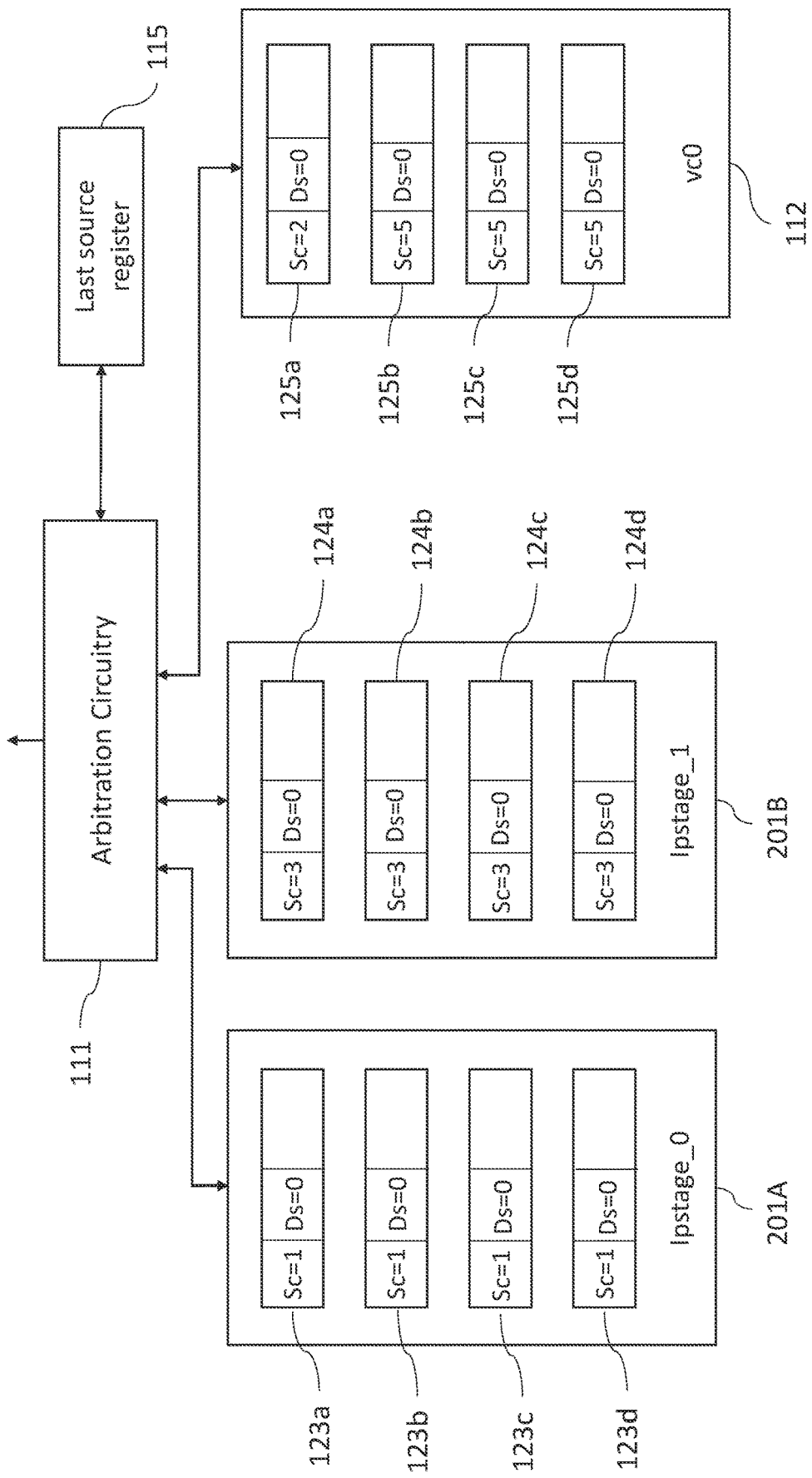
FIG. 2B illustrates an example embodiment in which the arbitration circuitry selects between two ingress buffers and a single virtual channel buffer.

To illustrate how this process is performed in the case that a selection process is performed between three buffers, reference is made to FIG. 2B. Reference is made to FIG. 2B, which illustrates the use of circuitry 111 for selecting between the first ingress buffer 201A, the second ingress buffer 112 and a further ingress buffer 201B. As in the case of the two way selection between buffers described above with respect to FIGS. 1B to 1D, this three way selection is performed on the basis of the sources from which data at the head of each buffer 201A, 201B, 112 originated. The circuitry 111 applies a round robin to select between the three buffers 201A, 201B, 112 in dependence upon the sources from which the data packets at the heads of the buffers 201A, 201B, 112 originated, and in dependence upon the last source identifier in register 115.

In the example of FIG. 2B, the first ingress buffer 201A stores data packets originating from source Sc=1, the further ingress buffer 201B stores data packets originating from source Sc=3, whereas the second ingress buffer 112 stores data packets originating from sources Sc=2 and Sc=5.

Suppose that the register 115 identifies the originating source component of the data packet that was last sent from one of the buffers 201A, 201B, 112 as being source Sc=1. The circuitry 111 inspects the source identifier of the packet 125a that is at the head of the buffer 112 and compares this to the source identifiers of packets 123a and 124a. The packet 123a has a source identifier of source Sc=1, the packet 124a has a source identifier of source Sc=3, and the packet 125a has a source identifier of source Sc=2. Since the source identifier (Sc=2) of packet 125a is the next highest source identifier, the arbitration circuitry 111 causes the packet 125a to be sent over the egress port 106. The arbitration circuitry 111 then causes the identifier in the register 115 to be updated to an identifier of the source (i.e. Sc=2) from which packet 125a originated. The arbitration circuitry 111 then selects the packet 124a (since this has the next highest source identifier, i.e. Sc=3) as the next packet to send. After sending this packet 124a, the arbitration circuitry 111 then causes the identifier in the register 115 to be updated to an identifier of the source (i.e. Sc=3) from which packet 124a originated. The arbitration circuitry 111 then selects the packet 125b (since this has the next highest source identifier, i.e. Sc=5) as the next packet to send. After sending this packet 125b, none of the three packets 123a, 124b, 125c now at the heads of the buffers 201A, 201B, 112 have higher source identifiers, and therefore, the circuitry 111 selects the one of the packets, i.e. packet 123a with the lowest source number, i.e. Sc=1, as the next packet to send.

FIG. 2B illustrates an embodiment in which the ingress buffers 201A, 201B only comprise data packets 123a-d, 124a-d for delivery to a single destination, i.e. Ds=0. However, in some embodiments, the buffers 201A, 201B may comprise data packets for delivery to multiple destinations, such that the selection on the basis of the originating source component may only involve ones of the buffers 201A, 201B that has a next data packet for delivery to that particular destination.

Figure 2C:
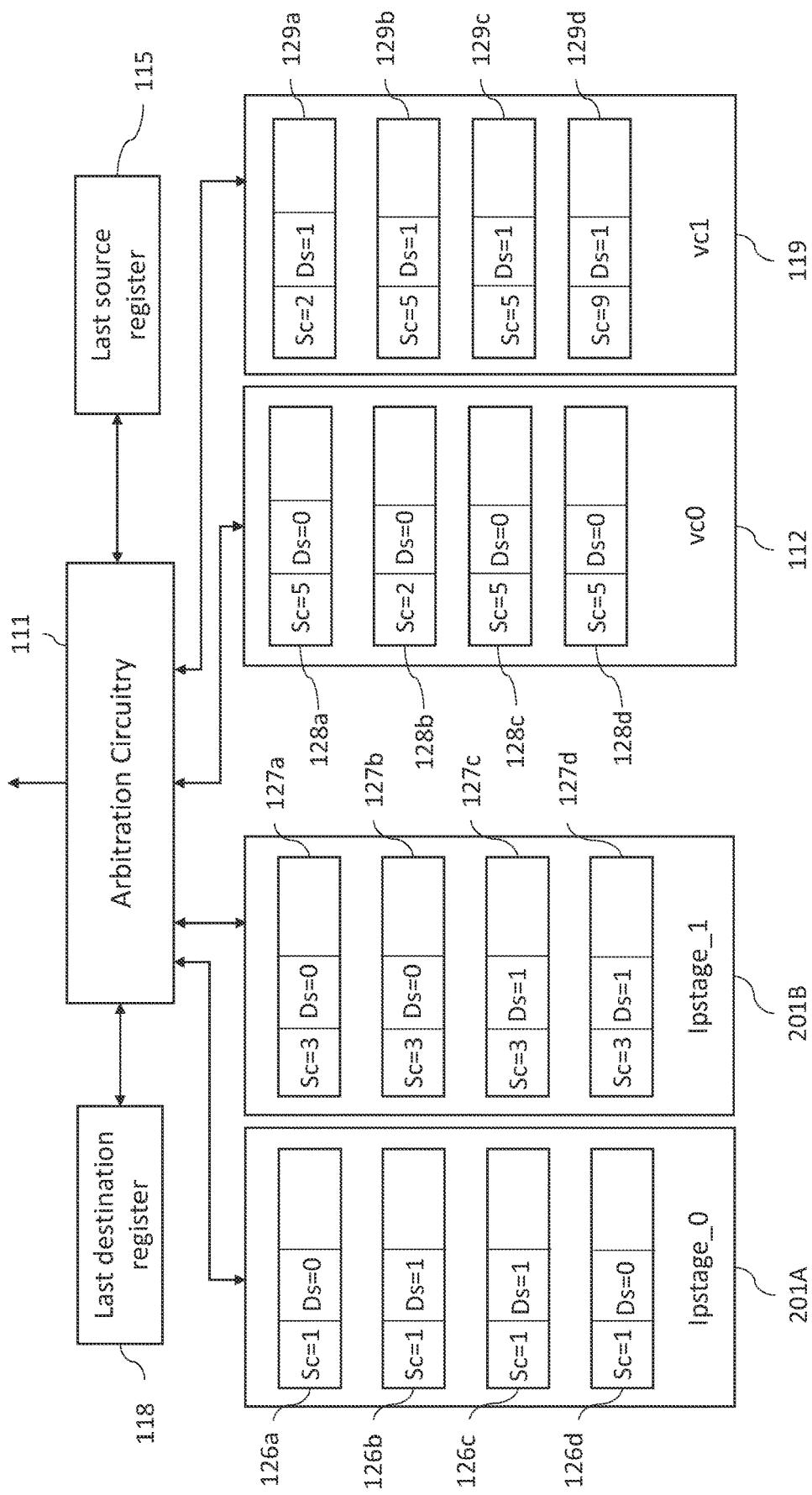
FIG. 2C illustrates an example embodiment in which the arbitration circuitry selects between two ingress buffers and two virtual channel buffers.

Reference is made to FIG. 2C, which illustrates an embodiment in which the circuitry 111 arbitrates between buffers 201A, 201B, 112, 119 on the basis of the destination to which packets in those buffers are to be sent and on the basis of the originating source components from which the packets were issued. In this case, a subset of the buffers 201A, 201B, 112, 119 having data packets at their heads for delivery to a given destination is selected by the circuitry 111. Having made the selection of the subset of buffers 201A, 201B, 112, 119, the circuitry 111 then selects one of this subset of buffers based on the originating source components of the next packets to be sent from each of those buffers.

In the same manner as described above with respect to FIG. 1D, in the embodiment of FIG. 2C, there is a last destination register 118 indicating the last destination to which a data packet was sent so as to enable a round robin between the destinations to be applied. Furthermore, there is also a last source register 115 that identifies for each of the destinations, data from which originating source component was last to send to that destination.

As an example, the circuitry 111 may be arranged to send a data packet to destination Ds=0 first. The circuitry 111 examines the packet 126a at the head of the first ingress buffer 201A. Since the packet 126a at the head of buffer 201A comprises an identifier of destination Ds=0, the circuitry 111 includes the first ingress buffer 201A in the subset of buffers between which the selection is to be performed on the basis of the originating sources. Since the packet 127a at the head of buffer 201B comprises an identifier of destination Ds=0, the circuitry 111 also includes the buffer 201B in the subset of buffers between which the selection is to be performed on the basis of the originating sources. The buffer 112 is dedicated to hold packets for delivery to destination Ds=0, and so this buffer 112 is included in the subset of buffers between which the selection is to be performed on the basis of the originating sources.

The circuitry 111, having determined the subset 201A, 201B, 112, selects one of the buffers in this subset in dependence upon the source identifiers (Sc=1, Sc=3, Sc=5) in packets 126a, 127a, 128a at the heads of these buffers 201A, 2016, 112. Supposing that the last source register 115 indicates Sc=1 as being the last originating source associated with data that was sent to destination Ds=0 over port 106. In this case, the circuitry 111, when selecting between the buffers 201A, 201B, 112, selects buffer 201B, since packet 127a has the next highest source identifier (Sc=3) at its head. The circuitry 111 causes the packet 127a to be sent over port 106.

After sending the packet 127a, the circuitry 111 updates the last source identifier for Ds=0 in the register 115 to the source identifier for packet 127a (i.e. Sc=3). The circuitry 111 also updates the last destination register 118 to Ds=0. The circuitry 111 then selects a subset of buffers for which the packets at the heads of buffers are for delivery to Ds=1. The circuitry 111 examines the packet 126a at the head of the first ingress buffer 201A. Since the destination identifier for this packet 126a is Ds=0, the circuitry 111 does not include buffer 201A in the subset of buffers. The circuitry 111 examines the packet 127b at the head of the second ingress buffer 201B. Since the destination identifier for this packet 127b is Ds=0, the circuitry 111 does not include buffer 201B in the subset of buffers. The buffer 119 is dedicated to hold packets for delivery to destination Ds=1, and so this buffer 119 is included in the subset of buffers between which the selection is to be performed on the basis of the originating sources. Since there is only one buffer (i.e. buffer 119) having data at its head for sending to Ds=1, the circuitry 111 sends data packet 129a from buffer 119 without performing arbitration on the basis of the source components. After sending the packet 129a, the circuitry 111 updates the last source identifier for Ds=1 in the register 115 to the source identifier for packet 129a (i.e. Sc=2). The circuitry 111 also updates the last destination register 118 to Ds=1.

The circuitry 111 is configured to then send a packet to Ds=0 again. The circuitry 111 includes in the subset of buffers, buffers 201A, 201B, and 112, since these each have packets 126a, 127b, 128a at their heads for delivery to Ds=0. This selection between buffers 201A, 201B, 112 is performed in dependence upon the source components from which those packets 126a, 127b, 128a originate. The circuitry 111 obtains the identifier of the last source component from which a data packet was sent to Ds=0 from the register 115. The circuitry 111 applies the round robin scheme between the sources as described and sends the one of the packets 126a, 127b, 128a with the source number that is the next highest (or the lowest if the source identifier from register 115 is highest that than the source identifiers of the packets 120a, 122a) after the source identifier obtained from register 115 for destination Ds=1. In this case, the next highest of the source identifiers of packets 126a, 127b, 128a is Sc=5 and, therefore, packet 128a from buffer 112 is selected for dispatch over the egress port 106.

The circuitry 111 continues with the sending of packets 120a-d, 121a-d, 122a-d according to the described scheme for arbitrating between sources and destinations.

Figure 2D:
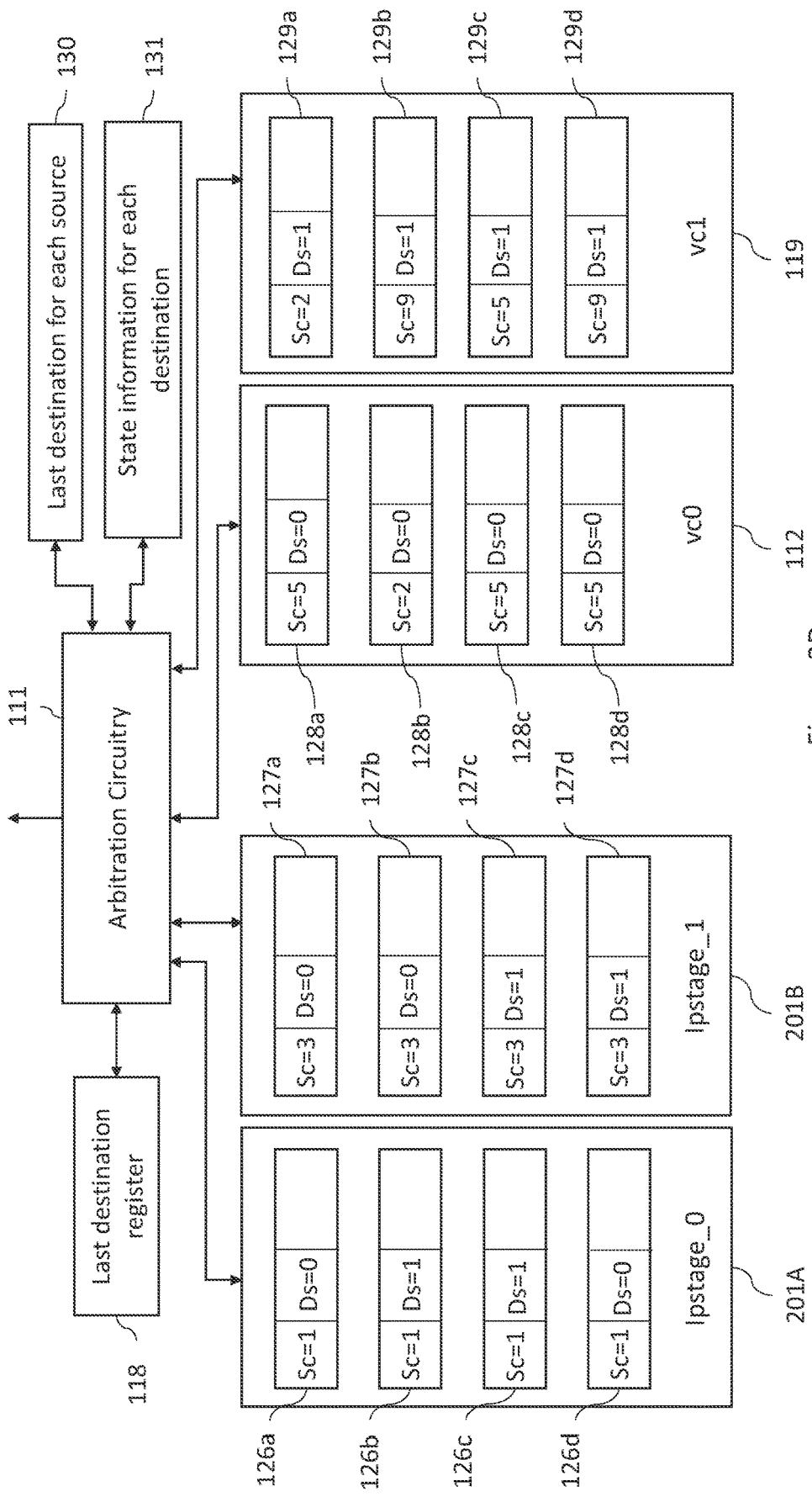
FIG. 2D illustrates a further example embodiment in which the arbitration circuitry selects between two ingress buffers and two virtual channel buffers.

As described above with respect to FIG. 1E, selection between buffers may instead be performed using weights associated with each of the buffers 107, where those weights are based on the number of sources which last sent from each of buffers 107. These weights are used to perform a weighted round robin for buffer selection. Reference is made to FIG. 2D, which illustrates an example in which such a scheme may be applied to perform weighted round robin arbitration between a selected one of buffers 107 and multiple buffers 201A, 201B. In this example, as in the example of FIG. 1E, the register 131 stores state information for each destination, the state information indicating a next buffer selected for sending to that destination. In the FIG. 2D example, the next buffer indicated in the state information for Ds=0 will be one of buffer 112, buffer 201A or buffer 201B, whereas the next buffer indicated in the state information for Ds=1 will be one of buffer 119, buffer 201A or buffer 201B. The state information also specifies for each of buffers 112, 119, a count of a number of packets consecutively sent from the respective buffer, prior to the weight of the respective buffer being reached. This count for buffer 112 is updated by circuitry 111 when a packet is sent from the buffer 112 and the count for buffer 119 is updated by circuitry 111 when a packet is sent from the buffer 119. Upon the count for either buffer 112, 119 reaching the weight, the count for that buffer is reset and the next buffer indication in the state is updated to identify buffer 201A.

In the example of FIG. 2D, suppose that data from source Sc=5 was last sent from buffer 112, whereas data from sources Sc=2 and Sc=9 was last sent from buffer 119. These indications are held in register 130. Since data originating from two sources (i.e. Sc=2 and Sc=9) was last sent from buffer 119, buffer 119 (and its associated destination) has a weight of two (which is implicit from the indications in register 130). On the other hand, since data originating from one source (i.e. Sc=5) was last sent from buffer 112, buffer 112 (and its associated destination) has a weight of one (which is implicit from the indications in register 130). Suppose further that for Ds=0, the associated state information in register 131 indicates that a data packet is next to be sent from buffer 112, whereas for Ds=1, the associated state information in register 131 indicates that a data packet is next to be sent from buffer 119.

If the circuitry 111 determines that the next destination to which data is to be sent over port 106 is Ds=0, the circuitry 111 sends data packet 128a from buffer 112. After sending this packet 128a, the circuitry 111 determines that the count of packets sent consecutively from buffer 112 is equal to the weight (i.e. one) for the buffer 112. In response to this determination, the circuitry 111 updates the state information for Ds=0 in register 131 to indicate the buffer 201A as the next buffer for Ds=0. The circuitry 111 also reset the count for buffer 112 to zero.

Following the sending of packet 128a, the circuitry 111 then selects Ds=1 as the next destination to which data is to be sent over port 106. The circuitry 111 sends packet 129a from buffer 119 over the port 106. After sending this packet 129a, the circuitry 111 sets the count of packets sent consecutively from buffer 119 to be equal to one.

After sending packet 129a, the circuitry 111 then selects Ds=0 as the next destination to which data is to be sent over port 106. In response to determining that the packet 126a at the head of buffer 201A is for dispatch to Ds=0, the circuitry 111 causes packet 126a to be sent over port 106. The circuitry 111 then updates the state information associated with Ds=0 to indicate buffer 201B as the next buffer for Ds=0.

After sending packet 126a, the circuitry 111 then selects Ds=1 as the next destination to which data is to be sent over port 106. The circuitry 111 sends packet 129b from buffer 119 over the port 106. After sending this packet 129b, the circuitry 111 determines that the count of packets sent from buffer 119 is equal to the weight (i.e. two) for buffer 119 and, in response, resets the count for buffer 119 to zero and updates the state information for Ds=1to indicate buffer 201A as the next buffer to send to Ds=1.

After sending packet 129b, the circuitry 111 then selects Ds=0 as the next destination to which data is to be sent over port 106. In response to determining that buffer 201B is indicated in the state information for Ds=0 as being the next packet to send over port 106 to Ds=0, the circuitry 111 sends packet 127a over the port 106. The circuitry 111 then updates the state information for Ds=0 to indicate buffer 112 as the next buffer from which data is to be sent to Ds=0.

After sending packet 127a, the circuitry 111 then selects Ds=1 as the next destination to which data is to be sent over port 106. The state information for Ds=1 indicates buffer 201A as the next buffer from which data is to be sent over port 106. In response to determining that the packet 126b at the head of buffer 201A is for dispatch to Ds=1, the circuitry 111 causes this packet 126b to be sent over port 106 towards Ds=1.

In this way, the circuitry 111 continues to arbitrate between the sources for sending data by applying separate weighted round robins for a first set of buffers (i.e. buffers 201A, 201B, 112) and a second set of buffers (i.e. buffers 201A, 201B, 119).

In the above examples described with respect to FIGS. 1B to 1E and 2B to 2D a number of registers 115, 118, 130, 131 are described for storing indications used to perform the arbitration between different destinations and/or different sources. In some embodiments, one or more of these registers 115, 118, 130, 131 may be combined into a single unified storage. Alternatively, one or more of the described registers 115, 118, 130, 131 may be subdivided into multiple registers. What is important is the information stored by the hardware module 100, 200 that enables the selection of the appropriate buffer from which to send data.

Although with respect to the examples shown in FIGS. 2B, 2C, and 2D selection between only two local ingress buffers 201A, 201B is described, the same selection scheme may be applied for use with more than two of such buffers for receiving data from locally connected source components. Furthermore, although arbitration between only two destinations is described with respect to FIGS. 1D, 1E, 2C and 2D, arbitration between more than two destinations may be performed.

In the examples described above with respect to FIGS. 1A to 2D, it is described that selection between buffers (e.g. first ingress buffer 105/201A and second ingress buffer 112) is performed on the basis of the originating source components for the data packets at the heads of those buffers. In cases in which one of these buffers is empty, the empty buffer is excluded from the selection process.

In some embodiments, the hardware module may have multiple egress ports via which locally attached source components may send data to destinations. In this case, the hardware (i.e. ingress buffers 105, 107 and arbitration circuitry 111) is duplicated for each additional egress port.

Figure 3:
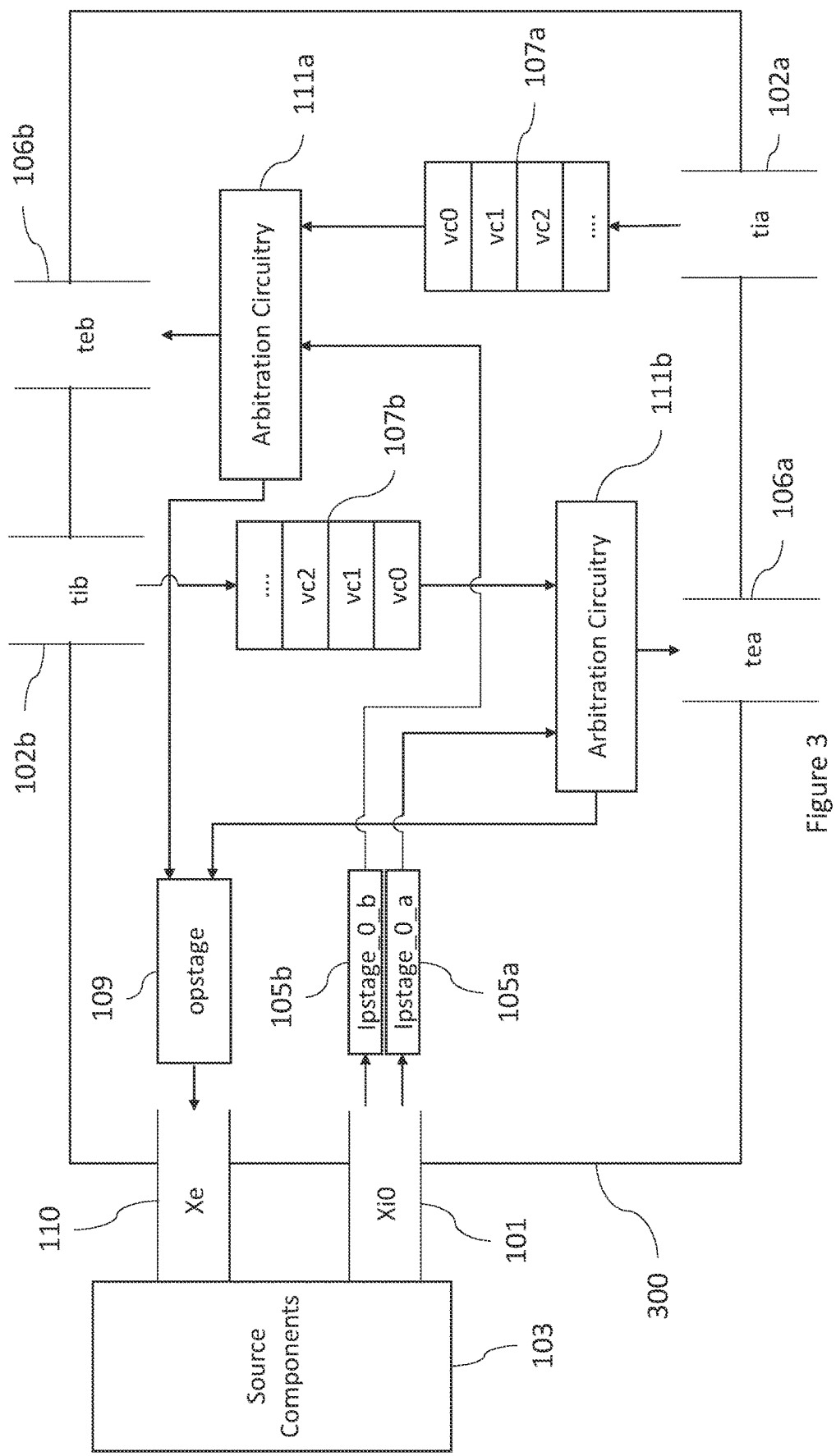
FIG. 3 illustrates an example hardware module supporting the ingress of data from multiple other hardware module and the egress of data to those other hardware modules.

Reference is made to FIG. 3, which illustrates an example hardware module 300 in which there are multiple egress ports 106a, 106b via which data packets received from the one or more source components 103 may be sent from the hardware module 300. A certain set of destinations are accessible over port 106a, whilst a different set of destination are accessible over port 106b.

The example hardware module 300 includes some of the same components described above with reference to FIG. 1A. In particular, the hardware module 300 includes a first ingress port 101, an egress port 110, and an egress buffer 109. The hardware module includes two ingress buffers 105a, 105b, which both function in the manner of the first ingress buffer 105 described above. Buffer 105a is associated with egress port 106a, whilst buffer 105b is associated with egress port 106b. Circuitry of the hardware module 300 sorts data packet received on the port 101 from one or more source components 103 into buffer 105a or buffer 105b in dependence upon destination identifiers in the headers of the packets. Specifically, packets for delivery to destinations accessible over egress port 106b are stored in buffer 105b, whilst those accessible over egress port 106a are stored in buffer 105a.

The hardware module includes a set of buffers 107a for receiving data packets via ingress port 102a and a set of buffers 107b for receiving data packets via ingress port 102b. Each of these sets of buffers 107a, 107b has the same features and functions in the same way as buffers 107 described above with respect to FIGS. 1A to 2D. Buffers 107a hold data packets for delivery either over egress port 106b or for delivery to locally attached source components 103 via egress port 110. Buffers 107b hold data packets either for delivery over egress port 106a or for delivery to locally attached source components 103 via egress port 110.

The hardware module 300 includes arbitration circuitry 111a and arbitration circuitry 111b. Each has the same features and functions in the same way as the arbitration circuitry 111 described above. The circuitry 111a, 111b is able to arbitrate between buffers on the basis of the source and destination in the manner described with respect to any of the embodiments described above with respect to FIGS. 1B-1E and 2B-2D. The circuitry 111a selects between buffers 105a, 107a for sending of data over interface 106b, whilst the circuitry selects between buffers 105b, 107b for sending of data over interface 106a.

Although FIG. 3 shows only a single pair of ingress buffers 105, 105b for receiving data packets from source components 103 via a single ingress port 101, in some embodiments, the hardware module 300 may comprise a plurality of ingress ports and ingress buffers as shown in FIG. 2A. In this case, each ingress port may be associated with a pair of ingress buffers, where for each pair of ingress buffers, one of the buffers is associated with circuitry 111A and another is associated with circuitry 111B. In this way, each circuitry 111A, 111B selects between the sending of data packets from more than two buffers in the manner described with respect to FIGS. 2A-D.

Each of the example hardware modules 100, 200, 300 described above is configured to send a single data packet over an egress port once per clock cycle. Within each single clock cycle, the circuitry 111 of the hardware module 100, 200 selects a buffer (on the basis of the destination identifier or source identifier of the data packet at the head of that buffer) and sends the packet at the head of that buffer. For the module 300, within each clock cycle: the circuitry 111a selects a buffer and sends a packet from that buffer, and the circuitry 111b selects a further buffer and sends a further packet from that buffer.

The hardware module 100, 200, 300 described above has the advantage of providing fairness between sources sending data packets to particular destinations, where on at least one port data is received from multiple different sources. In some embodiments, a chain of hardware modules is provided in an interconnect, where each hardware module functions as a node in the interconnect.

Reference is made to FIG. 4, which illustrates an interconnect 410 comprising a plurality of hardware modules 400a-f. Each of the hardware modules 400a-f may be one of the example hardware modules 100, 200, 300 described above. Each of the hardware module 400a-f is a node in the interconnect 410 and is operable to forward packets to its neighbouring nodes 400a-f on the interconnect 410. The packets forwarded by each node 400a-f are received either from the node's locally attached component or from the node's neighbouring nodes 400a-f on the interconnect 410. The locally attached components are represented in FIG. 4 as b_(n-1), b_(n-2) . . . b_1, and b_0. Each of these locally attached components are attached to one of nodes 400a-e.

By employing the scheme described above in which arbitration is performed on the basis of sources of data, it is understood that fairness between the various sources (b_(n-1) to b_0) may be attained when providing data to a particular destination accessible on the interconnect 410.

In FIG. 4, an example destination is labelled as 'B(VC X)'. B(VC X) is a component attached to the node 400f. Suppose that each of the sources b_(n-1) to b_0 targets the destination B (VC X) by sending data packets to B (VC X). It is apparent that each of nodes 400b-400e receives data packets originated from its locally attached source component and data packets originated from source components attached to at least one of the nodes 400a-d. A scheme could be applied in which each node 400b-e arbitrates by applying a round robin between a single local ingress buffer and a further ingress buffer for receiving data from other nodes 400a-e. In this case, fairness between buffers would be provided, but not fairness between sources. If a simple round robin between buffers were applied, the sources closest to the destination B (VC X) would be prioritised. Node 400e would split the available bandwidth for sending to B(VC X) between b_0 (from which data is received on the node's 400e local ingress port and stored in the node's 400e local ingress buffer) and the combination of the other sources b_(n-1) to b_1 (from which data is received on the node's 400e second ingress port and stored in a same one of the node's 400e further buffers 107). Since the remote sources b_(n-1) to b_1 share the same buffer, providing fairness between buffers leads to a bias in favour of source b_0, with more bandwidth being allocated to this source. Similarly, node 400d splits its available bandwidth for sending data to B(VC X) between b_1 and the combination of the sources b_(n-1) to b_2, such that more bandwidth is allocated to b_1 than to the other sources b_(n-1) to b_2.

It is, therefore, understood that the bandwidth for delivery of data to B (VC X) from a particular source decreases with distance (i.e. number of nodes 400) from B (VC X). Furthermore, in some circumstances, it is possible that the bandwidth with which a node 400a-f may output data exceeds the bandwidth with which the sources b_(n-1) to b_0 may output data to their nodes 400a-e. In this case, the total time for each of the sources b_(n-1) to b_0 to send a set of data to the destination B (VC X) may be increased if fairness between sources is not provided for. Suppose that each node 400a-e may output data towards the destination B (VC X) at 96 Gbps, whilst each of the sources b_(n-1) to b_0 may output data to their respective nodes 400a-e at only 32 Gbps. Given the number of sources (greater than three), the 96 Gbps link to B (VC X) will be saturated when each of the source b_(n-1) to b_0 attempts to send data at its maximum rate. The sources (e.g. b_n-1) further from B (VC X) will stall, whilst sources (e.g. b_0) closer to B (VC X) will send at a higher rate and may use their full 32 Gbps. If each of the sources b_(n-1) to b_0 has an equal set of data to send, sources (e.g. b_0) closer to B (VC X) will finish first, whilst sources (e.g. b_(n-1)) further from B (VC X) will finish last. In this case, once the closer sources have finished sending their data, such that only the furthest sources are still sending data, the 96 Gbps link to B(VC X) will no longer be saturated, implying wasted bandwidth and an increase in the total time required for transmission from all of the sources b_(n-1) to b_0.

Therefore, according to embodiments, each of the nodes 400a-f selects between its local ingress buffer/s and further buffer/s (for receiving from other nodes 400a-f) by arbitrating between sources as described. In this way, fairness is ensured between each of the sources b_(n-1) to b_0 for transmitting to B (VC X). For example, assuming each of the sources b_(n-1) to b_0 is transmitting at the same rate, node 400f will send data to B (VC X) at an equal rate from each of b_(n-1) to b_0. Similarly, node 400e will send data to node 400f at an equal rate from each of b_(n-1) to b_1. In embodiments, the bandwidth (e.g. 96 Gbps) for node 400f to transmit data (e.g. via egress buffer 109) to B (VC X) is greater than the bandwidth (e.g. 32 Gbps) at which each of the sources b_(n-1) to b_0 may output data. In a case in which each of the sources b_(n-1) to b_0 has an equal set of data to send to B (VC X), the fairness provided between sources ensures that the link bandwidth between node 400*f* and B (VC X) remains saturated at 96 Gbps throughout the sending of data. Hence, the total time to send the data is reduced.

It is therefore seen from the example given in FIG. 4 that embodiments are particularly advantageous when used in an arrangement in which multiple instances of the hardware module 100, 200, 300 are provided together as nodes 400 of an interconnect and where the aggregate send bandwidth of the sources exceeds the receive bandwidth of the destination to which they are sending. In this case, by providing for fairness between the sources at each node 400 in the interconnect, the receive bandwidth is constantly saturated throughout the transfer of data, thus minimising the total transfer time.

Figure 5:
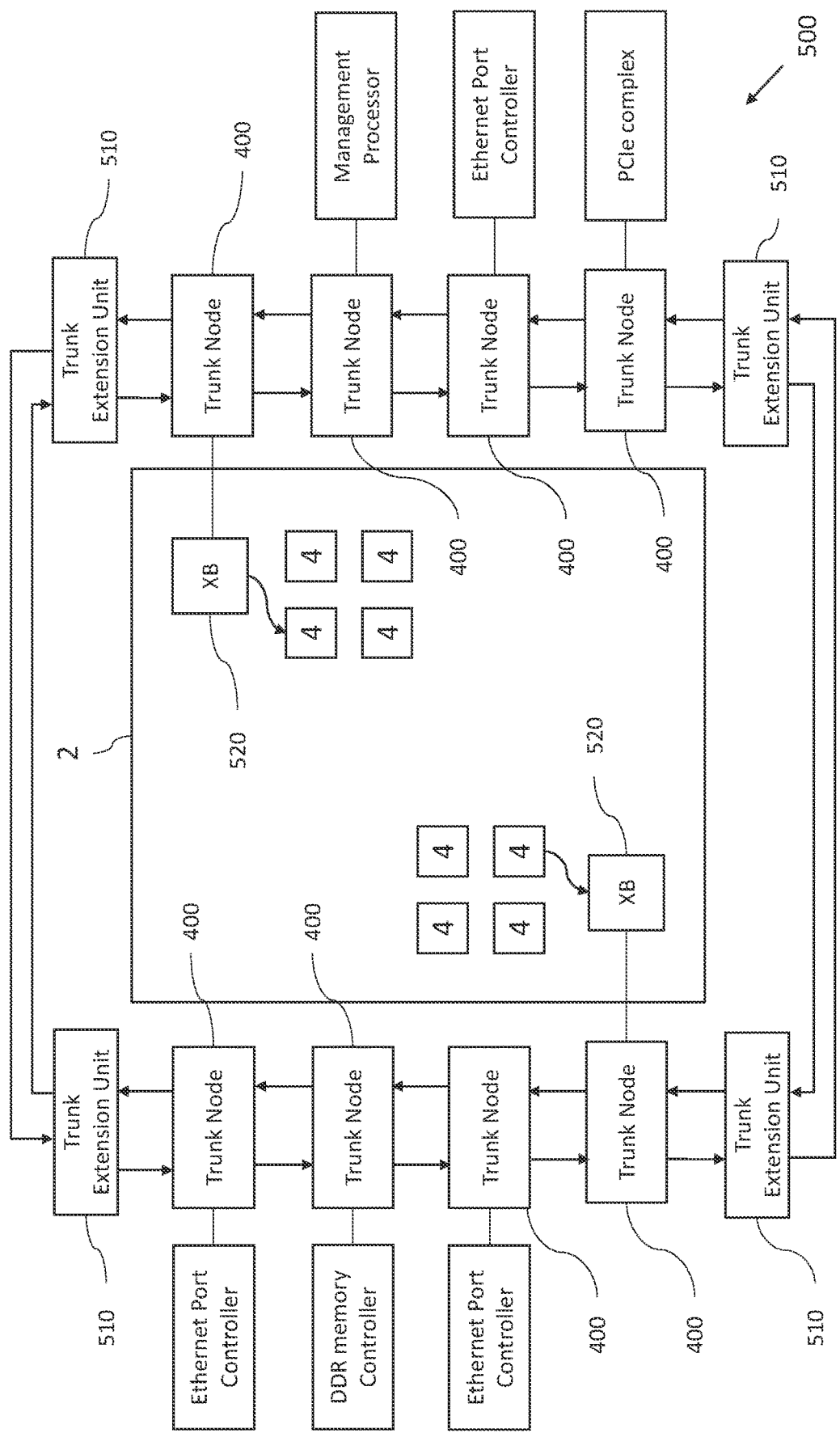
FIG. 5 illustrates an example of how the interconnect is used to deliver data packets to components of the chip.

Reference is made to FIG. 5, which illustrates a further example embodiment of a system on chip 500 including the interconnect. In this example, the nodes 400 are shown as trunk nodes 400. Each of the trunk nodes 400 has two neighbouring trunk nodes 400 to which it is able to transmit and receive data packets. The trunk node 400 may take the form of the hardware module 300 shown in FIG. 3. The interconnect also includes include trunk extension units 510, which serve as nodes to route traffic from one side of the chip to the other. The trunk extension units 510 function as simplified versions of the trunk nodes 400, which do not attach to a SoC component (other than to a trunk node 400).

The interconnect is arranged in a ring, around which packets may circulate. The packets may pass around the interconnect in a clockwise or counter-clockwise direction. The packets have headers including information, such as destination identifiers and source identifiers, enabling the nodes 400 to store them in the appropriate virtual channel buffers 107 and to select them to be sent by arbitrating on the basis of the destination and source identifiers.

The chip includes a processing unit 2, which includes a plurality of processor tiles 4. The interconnect forms a ring path around the processing unit 2 and is used for the transport of data packets to and from the tiles 4 of the processing unit 2. The interconnect also transports data packets to and from other SoC components of the chip. The interconnect is used for transporting data plane traffic (e.g. application instructions and application data for processing by tiles 4). The interconnect transports this data plane traffic between tiles 4 and the host system, or between tiles 4 and directly attached external memory. Each of the tiles 4 may exchange data packets with a trunk node via an associated exchange block 520. The exchange blocks 520 convert the packets between the ELink packet format, suitable for transmission around the interconnect between the nodes 400, and the TLink packet format, used for delivery of packets between the tiles 4 and the exchange blocks 520.

A variety of components are shown attached to the nodes 400 of the interconnect. One example of such a component is a PCI complex for interfacing with the host or for interfacing with another chip. The PCIe complex receives packets from it associated node 400 and supplies these to the host or to another chip. Such packets may be read or write request packets sent by tiles 4 on the chip for reading or writing data to/from the host or may be write packets sent by tiles 4 on another chip to write data to memory of tiles 4 on a connected chip. The PCIe complex receives packets from the host or from another chip 500 and converts them to the Elink packet format for circulating on the interconnect for supply to another component accessible on the interconnect. The PCIe complex, therefore, may act as both an attached source and attached destination for its associated trunk node 400.

A further component accessible on the interconnect is the DDR memory controller for reading/writing data to/from the on-chip DDR memory. This memory is accessible to the tiles 4 over the interconnect.

Further components accessible on the interconnect are Ethernet port controllers for sending and receiving data over an Ethernet network.

For forwarding data between the trunk nodes 400, a plurality of virtual channels are defined in both directions around the ring interconnect. Each of these virtual channels is associated with one of the buffers 107*a*, 107*b*. The virtual channels are defined to prevent HOL blocking. A virtual channel on the interconnect serves exactly one of the components accessible on the ring. Each virtual channel has its own dedicated buffer in each of the nodes 400. A node forwards received packets based on the occupancy of the buffers of the virtual channels in the upstream node 400. Each node 400 supplies credit signals to its neighbours for each virtual channel, where those credits signals indicated the occupancy of the buffers for each virtual channel. In this way, the nodes 400 may apply back-pressure on the interconnect on a per virtual channel basis.

In the above description operation have been described as being performed by a hardware module 100/200/300/400. These operations described as being performed by the hardware module may be performed by any suitable circuitry (including circuitry 111, 111*a*, 111*b* or other circuitry) of the module 100/200/300/400. This circuitry may take the form of dedicated processing circuitry, such as field programmable gate array (FPGA) or application specific integrated circuit (ASIC), or may take the form of a processor configured to execute computer readable instructions to perform the operations described.

Figure 6:
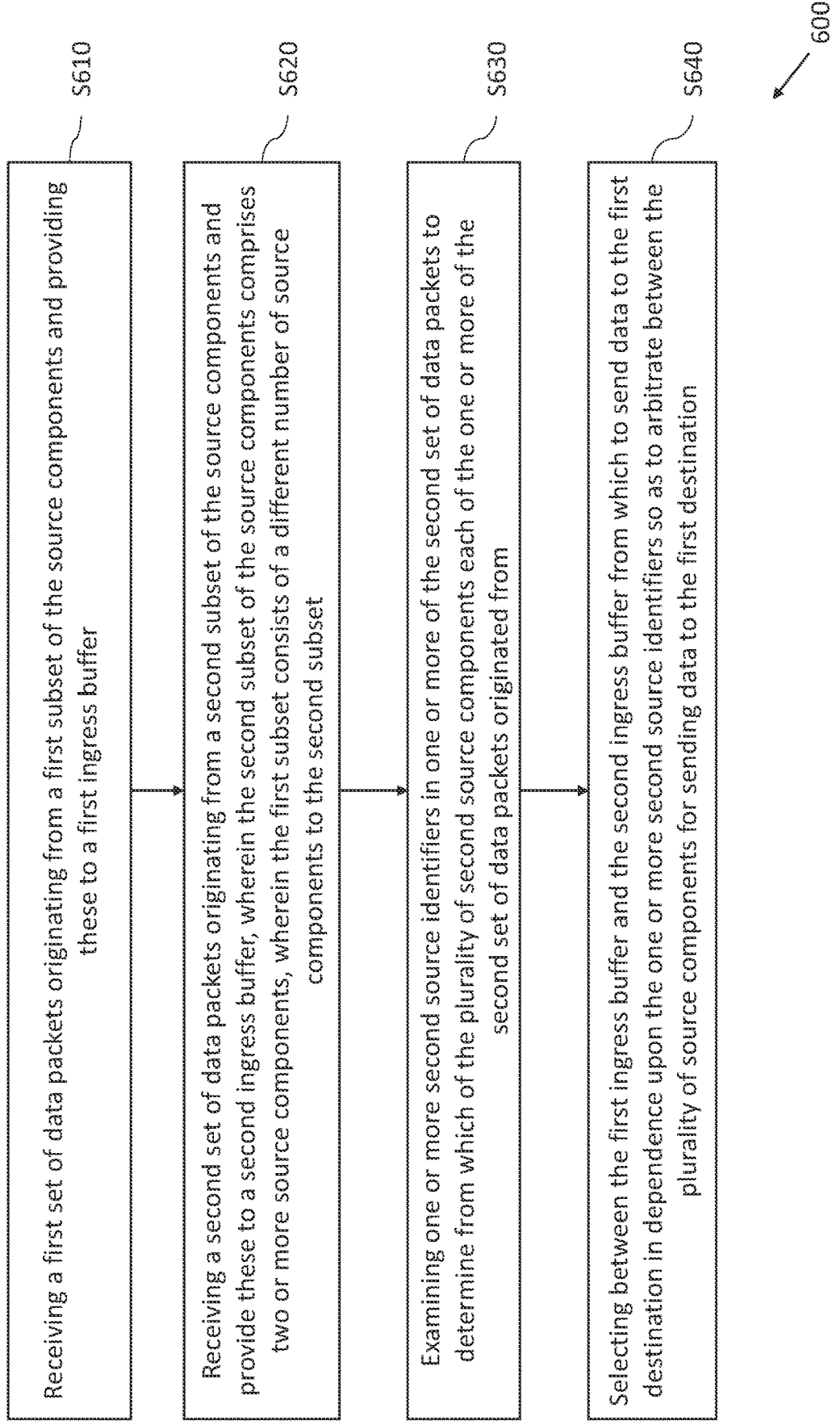
FIG. 6 illustrates an example of a method according to embodiments of the application.

Reference is made to FIG. 6, which illustrates a method 600 according to embodiments of the application.

At S610, the first ingress port receives a first set of data packets originating from a first subset of the source components and provides these to a first ingress buffer. The first subset consists of one or more of the plurality of source components.

At S620, the second ingress port receives a second set of data packets originating from a second subset of the source components and provides these to a second ingress buffer. The second subset of the source components comprises two or more source components. The first subset consists of a different number of source components to the second subset.

At S630, the processing circuitry examines one or more second source identifiers in one or more of the second set of data packets to determine from which of the plurality of second source components each of the one or more of the second set of data packets originated from.

At S640, the processing circuitry selects between the first ingress buffer and the second ingress buffer from which to send data to the first destination in dependence upon the one or more second source identifiers so as to arbitrate between the plurality of source components for sending data to the first destination.

It would be appreciated that embodiments have been described by way of example only.

The invention claimed is:

1. A hardware module for receiving data from a plurality of source components and forwarding at least some of that data to a first destination, the hardware module comprising:

a first ingress port configured to receive a first set of data packets originating from a first subset of the source components and to provide the first set of data packets to a first ingress buffer, wherein the first subset includes one or more of the plurality of source components;

a second ingress port configured to receive a second set of data packets originating from a second subset of the source components and to provide the second set of data packets to a second ingress buffer, wherein the second subset of the source components comprises two or more source components, wherein the first subset includes a different number of source components than does the second subset;

an egress port configured to output the first set of data packets and the second set of data packets, wherein the egress port is further configured to output data to a plurality of destinations including the first destination, and wherein some of the first set of data packets are for dispatch to different ones of the plurality of destinations; and processing circuitry configured to:
examine a destination identifier in the one of the first set of data packets that is at a head of the first ingress buffer; and examine one or more second source identifiers in one or more of the second set of data packets to determine from which of the second subset of the source components each of the one or more of the second set of data packets originated; and in response to determining that the destination identifier identifies the first destination, select between the first ingress buffer and the second ingress buffer from which to send data to the first destination in dependence upon the one or more second source identifiers so as to arbitrate between the plurality of source components for sending data to the first destination.

2. The hardware module of claim 1, wherein the processing circuitry is configured to, upon selecting the second ingress buffer, send a first of the second set of data packets that is located at the head of the second ingress buffer, wherein the one or more second source identifiers are source identifiers of packets of the second set of data packets that were sent from the second ingress buffer prior to the sending of the first of the second set of data packets.

3. The hardware module of claim 1, comprising a storage configured to store an indication of a number of the source components for which data was last sent from the second ingress buffer, wherein the selecting between the first ingress buffer and the second ingress buffer comprises performing a weighted round robin between the first ingress buffer and the second ingress buffer, wherein the second ingress buffer is weighted by the number of the source components for which data was last sent from the second ingress buffer.

4. The hardware module of claim 3, wherein the hardware module comprises a set of ingress buffers configured to receive data originating from the second subset of the source components, the set of ingress buffers comprising the second ingress buffer.

5. The hardware module of claim 1, wherein a first of the first set of data packets that is located at head of the first ingress buffer originated from a first of the first subset of source components identified by a first source identifier, wherein the examining the one or more second source identifiers comprises examining a second source identifier in a first of the second set of data packets that is located at the head of the second ingress buffer, wherein the processing circuitry is configured to select the first of the second set of data packets for sending over the egress port in dependence upon the second source identifier in the first of the second set of data packets and the first source identifier.

6. The hardware module of claim 1, wherein the hardware module further comprises a register storing an identifier of one of the plurality of source components for which data was most recently sent to the first destination, wherein the selecting between the first ingress buffer and the second ingress buffer comprises selecting a next one of the plurality of source components which follows the one of the plurality of source components identified in the register in a sequence.

7. The hardware module of claim 1, wherein the selecting between the first ingress buffer and the second ingress buffer comprises applying a round robin scheme between the plurality of sources components.

8. The hardware module of claim 1, wherein the first subset of the source components consists of a single source component, wherein the first ingress buffer is dedicated to hold data packets originating from the single source component.

9. The hardware module of claim 1, wherein the hardware module comprises a set of ingress buffers for storing data originating from the second subset of the source components, wherein each of the set of ingress buffers is dedicated for storing data for sending to a different destination of the plurality of destinations, wherein the second ingress buffer is dedicated for storing data for sending to the first destination.

10. The hardware module of claim 1, wherein the processing circuitry is configured to, prior to the selecting between the first ingress buffer and the second ingress buffer:

as part of an arbitration scheme for arbitrating between the plurality of destinations for sending of data over the egress port, select the first destination as a next destination to which data is to be sent.

11. The hardware module of claim 1, wherein a first bandwidth available for sending over the egress port exceeds a second bandwidth for receipt of data at the first ingress port.

12. The hardware module of claim 1, wherein the hardware module is a node on an interconnect, wherein the first ingress port is a local ingress port for receiving the first set of data packets from the first subset of the plurality of source components, which are attached to the node, wherein the second ingress port is configured to receive the second set of data packets from a further node of the interconnect.

13. The hardware module of claim 1, wherein the second ingress port is configured to receive data for delivery to at least one of the first subset of source components, wherein the processing circuitry is configured to provide this data for delivery to the at least one of the first subset of source components over a further egress port of the hardware module.

14. The hardware module of claim 1, wherein the hardware module is included in a device that comprises the plurality of the source components and the first destination.

15. The hardware module of claim 14, wherein the device further comprises a plurality of instances of the hardware module connected together as nodes forming part of an interconnect, wherein each of the instances is configured to receive data from a different one or more of the source components.

16. The hardware module of claim 14, wherein the hardware module is included in an integrated circuit that comprises the plurality of the source components and the first destination.

17. A method for receiving data from a plurality of source components and forwarding the data to a first destination of a plurality of destinations, the method comprising:
- receiving a first set of data packets originating from a first subset of the source components and providing the first set of data packets to a first ingress buffer, wherein the first subset includes one or more of the plurality of source components, wherein some of the first set of data packets are for dispatch to different ones of the plurality of destinations;
- receiving a second set of data packets originating from a second subset of the source components and providing the second set of data packets to a second ingress buffer, wherein the second subset of the source components comprises two or more source components, wherein the first subset includes a different number of source components than does the second subset;
- examining a destination identifier in one of the first set of data packets that is at a head of the first ingress buffer;
- examining a source identifier in a first data packet of the second set of data packets to determine from which of the second subset of the source components the first data packet originated; and
- in response to determining that the destination identifier identifies the first destination, selecting between the first ingress buffer and the second ingress buffer from which to send data to the first destination in dependence upon the source identifier so as to arbitrate between the plurality of source components for sending data to the first destination.

18. A non-transitory computer readable medium storing a computer program comprising a set of computer readable instructions, which when executed by at least one processor, cause a method to be performed, the method comprising:
- examining a destination identifier in one of a first set of data packets that is at a head of a first ingress buffer, the first set of data packets originating from a first subset of a plurality of source components, wherein the first subset consists of one or more of a plurality of source components, wherein some of the first set of data packets are for dispatch to different ones of a plurality of destinations;
- examining one or more second source identifiers in one or more of a second set of data packets held in a second ingress buffer to determine from which of a second subset of a plurality of source components each of the one or more of the second set of data packets originated from, wherein the second subset of the plurality of source components comprises two or more source components, wherein the first subset of the source components consists of a different number of source components to the second subset; and
- in response to determining that the destination identifier identifies a first destination of the plurality of destinations, selecting between the first ingress buffer and the second ingress buffer from which to send data to the first destination in dependence upon on the one or more second source identifiers so as to arbitrate between the plurality of source components for sending data to the first destination.

* * * * *